US010513970B2

(12) United States Patent
Vezina et al.

(10) Patent No.: US 10,513,970 B2
(45) Date of Patent: Dec. 24, 2019

(54) HEAT EXCHANGER FOR A SNOWMOBILE ENGINE AIR INTAKE

(71) Applicant: BOMBARDIER RECREATIONAL PRODUCTS INC., Valcourt (CA)

(72) Inventors: Sebastien Vezina, Sherbrooke (CA); Jonathan Fortier, Lawrenceville (CA); Alain Lavoie, Drummondville (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 16/225,358

(22) Filed: Dec. 19, 2018

(65) Prior Publication Data

US 2019/0120123 A1  Apr. 25, 2019

Related U.S. Application Data

(60) Division of application No. 15/506,005, filed as application No. PCT/IB2014/064342 on Sep. 9, 2014, (Continued)

(51) Int. Cl.
*F02B 29/04* (2006.01)
*B60K 13/02* (2006.01)
*F02M 35/10* (2006.01)
*B62M 27/02* (2006.01)
*B60K 11/04* (2006.01)

(52) U.S. Cl.
CPC .............. *F02B 29/04* (2013.01); *B60K 13/02* (2013.01); *B62M 27/02* (2013.01); *F02M 35/10157* (2013.01); *B60K 11/04* (2013.01); *B60Y 2200/252* (2013.01); *B60Y 2306/05* (2013.01); *B62M 2027/023* (2013.01); (Continued)

(58) Field of Classification Search
CPC ....................... B62M 27/02; B62M 2027/023
See application file for complete search history.

(56) References Cited

U.S. PATENT DOCUMENTS 2,766,514 A  10/1956 Adams
2,882,588 A   4/1959 Rieppel et al.
(Continued)

FOREIGN PATENT DOCUMENTS

DE  102004032353 A1  1/2006
JP      1992059425 A  2/1992
(Continued)

OTHER PUBLICATIONS

International Search Report of PCT/IB2014/064342; Blaine R. Copenheaver; dated Dec. 24, 2014.
(Continued)

*Primary Examiner* — Kevin Hurley
(74) *Attorney, Agent, or Firm* — BCP LLP

(57) ABSTRACT

A snowmobile has a frame including an inverted U-shaped tunnel having top, left and right portions at least partly enclosing a space. A drive track, operatively connected to an engine, is disposed around a rear suspension and at least partly in the space. An air intake system has a heat exchanger surface disposed in or adjacent to the space. Air flowing through the intake system contacts the heat exchanger surface to be cooled thereby before entering the engine.

18 Claims, 25 Drawing Sheets

Related U.S. Application Data now Pat. No. 10,215,083, which is a continuation of application No. 14/473,306, filed on Aug. 29, 2014, now abandoned.

(60) Provisional application No. 61/898,182, filed on Oct. 31, 2013.

(52) U.S. Cl.
CPC . *B62M 2027/026* (2013.01); *B62M 2027/028* (2013.01); *Y02T 10/144* (2013.01); *Y02T 10/146* (2013.01)

(56) References Cited

U.S. PATENT DOCUMENTS

| | | | |
|---|---|---|---|
| 2,991,047 A | 7/1961 | Bailys | |
| 3,141,500 A | 7/1964 | Raskin | |
| 3,734,178 A | 5/1973 | Soudron | |
| 3,901,335 A | 8/1975 | Johnson | |
| 5,117,932 A | 6/1992 | Kurosu et al. | |
| 5,152,365 A | 10/1992 | Aoshima | |
| 5,205,348 A | 4/1993 | Tousignant et al. | |
| 5,251,718 A | 10/1993 | Inagawa et al. | |
| 5,277,266 A | 1/1994 | Robinson | |
| 5,307,869 A | 5/1994 | Blomgren | |
| 5,417,280 A | 5/1995 | Hayashi et al. | |
| 5,443,116 A | 8/1995 | Hayashi et al. | |
| 5,517,757 A | 5/1996 | Hayashi et al. | |
| 5,918,664 A | 7/1999 | Torigoe | |
| 5,957,230 A | 9/1999 | Harano et al. | |
| 5,984,000 A | 11/1999 | Nakamura et al. | |
| 6,070,428 A | 6/2000 | Higashiyama et al. | |
| 6,216,809 B1 | 4/2001 | Etou et al. | |
| 6,340,053 B1 | 1/2002 | Wu et al. | |
| 6,651,765 B1 | 11/2003 | Weinzierl | |
| 6,948,557 B2 | 9/2005 | Higashiyama et al. | |
| 6,962,194 B2 | 11/2005 | Martin et al. | |
| 7,025,127 B2 | 4/2006 | Wu et al. | |
| 7,036,619 B2 | 5/2006 | Yatagai et al. | |
| 7,104,352 B2 | 9/2006 | Weinzierl | |
| 7,264,075 B2 | 9/2007 | Schuemacher et al. | |
| 7,533,749 B1 | 5/2009 | Sampson et al. | |
| 8,381,857 B1 * | 2/2013 | Sampson | B62M 27/00 180/190 |
| 9,038,758 B2 | 5/2015 | Vezina | |
| 2003/0164233 A1 | 9/2003 | Wu et al. | |
| 2005/0115700 A1 | 6/2005 | Martin et al. | |
| 2014/0075976 A1 | 3/2014 | Glugla et al. | |
| 2015/0375826 A1 | 12/2015 | Sampson et al. | |
| 2016/0016639 A1 | 1/2016 | Pard | |
| 2016/0368563 A1 | 12/2016 | Sampson et al. | |
| 2017/0158046 A1 * | 6/2017 | Vezina | B60K 11/04 |
| 2017/0305487 A1 * | 10/2017 | Lefebvre | B62J 35/00 |
| 2018/0029669 A1 | 2/2018 | Pard | |
| 2019/0063304 A1 * | 2/2019 | Lefebvre | F02B 29/0425 |
| 2019/0084643 A1 * | 3/2019 | Thompson | B60T 7/102 |

FOREIGN PATENT DOCUMENTS

| | | |
|---|---|---|
| WO | 9301463 A1 | 1/1993 |
| WO | 2013066925 A1 | 5/2013 |

OTHER PUBLICATIONS

2005 Polaris 900RMK Cooling/All Options (S05PL8/PM8/PN8), retrieved from http://www.polarispartshouse.com/oemparts/a/pol/503786d7f87002368411ec11/cooling-all-options on Feb. 9, 2017.
English translation of Abstract of DE102004032353, retrieved from https://worldwide.espacenet.com/ on Feb. 9, 2017.
English translation of Abstract of JP1992059425, retrieved from https://worldwide.espacenet.com/ on Feb. 9, 2017.

* cited by examiner

HEAT EXCHANGER FOR A SNOWMOBILE ENGINE AIR INTAKE

CROSS-REFERENCE

The present application is a divisional of U.S. patent application Ser. No. 15/506,005, filed Feb. 23, 2017, which is a national phase entry of PCT Patent Application PCT/IB2014/064342, filed Sep. 9, 2014, which is a continuation of U.S. patent application Ser. No. 14/473,306, filed Aug. 29, 2014, which claims priority from U.S. Provisional Patent Application No. 61/898,182, filed Oct. 31, 2013, the entirety of each of which is incorporated by reference herein.

FIELD OF THE TECHNOLOGY

The present technology relates to heat exchangers for cooling air intake of snowmobile engines.

BACKGROUND

The efficiency of the combustion process in an internal combustion engine can be increased by decreasing the temperature of the air entering the engine for combustion. A decrease in air intake temperature provides a denser intake charge to the engine and allows more air and fuel to be combusted per engine cycle, increasing the output power of the engine. There is thus a need for a convenient and effective cooling system for removing heat from the air before its entry into the engine for the combustion process.

SUMMARY

It is an object of the present technology to ameliorate at least some of the inconveniences present in the prior art.

According to one aspect of the present technology, there is provided a snowmobile includes a frame including a tunnel, at least one ski connected to the frame, an engine supported by the frame and having an engine air inlet, a rear suspension assembly connected to the tunnel, and a drive track disposed around the rear suspension assembly and at least in part below the tunnel. The drive track is operatively connected to the engine. A heat exchanger connected to the tunnel includes a heat exchanger air inlet and a heat exchanger air outlet. The heat exchanger air outlet is fluidly communicating with the heat exchanger air inlet and with the engine air inlet.

According to some implementations, the heat exchanger is connected to a forward portion of the tunnel.

According to some implementations, the heat exchanger includes a heat exchanger surface which contacts snow projected by the drive track while the snowmobile is being propelled along snow-covered ground.

According to n some implementations, the tunnel includes a left side portion and a right side portion, the heat exchanger air inlet and the heat exchanger air outlet being disposed laterally between the left and right side portions.

According to some implementations, the tunnel also includes a top portion connected to the left and right portions, the heat exchanger air inlet and the heat exchanger air outlet being disposed vertically higher than the top portion.

According to some implementations, the snowmobile further includes an air compressor fluidly communicating with the heat exchanger air inlet to deliver compressed air to the engine via the heat exchanger.

According to some implementations, the air compressor is a turbocharger. The engine has an engine exhaust outlet fluidly communicating with the turbocharger for operating the turbocharger. Exhaust gas flows out of the engine through the engine exhaust outlet and then to the atmosphere via the turbocharger.

According to some implementations, the tunnel includes a left side portion and a right side portion separated by a gap, at least a portion of the heat exchanger being aligned laterally with the gap.

According to some implementations, a drive sprocket is operatively connecting the engine to the drive track. At least a portion of the heat exchanger is disposed above a horizontal plane containing an axis of rotation of the drive sprocket.

According to some implementations, a portion of the drive track is disposed vertically lower than the heat exchanger such that a vertical plane containing an axis of rotation of a front drive sprocket intersects the heat exchanger.

According to some implementations, the heat exchanger air outlet includes a plurality of heat exchanger air outlets. The engine air inlet includes the plurality of engine air inlets. Each heat exchanger air outlet of the plurality of heat exchanger air outlets is in fluid communication with a corresponding one of the plurality of engine air inlets.

According to some implementations, an airbox is fluidly communicating with the engine. Air passes through the airbox before entering the engine.

According to some implementations, the heat exchanger includes a forward portion and a rearward portion. The tunnel includes a top portion and a front portion extending downwardly and forwardly from the top portion. The rearward portion of the heat exchanger is at least partially connected to the top portion of the tunnel, and the forward portion of the heat exchanger is at least partially connected to the front portion of the tunnel.

According to some implementations, a portion of the rearward portion is disposed higher than the forward portion.

According to some implementations, a drive sprocket operatively connects to the engine to the drive track and defines a sprocket axis. The heat exchanger has a heat exchanger air inlet and a heat exchanger air outlet. At least a portion of the heat exchanger air inlet and at least a portion of the heat exchanger air outlet are disposed on opposite sides of a vertical plane containing the sprocket axis.

According to some implementations, a drive sprocket operatively connects the engine to the drive track and defines a sprocket axis. The heat exchanger has a heat exchanger air inlet and a heat exchanger air outlet. At least a portion of the heat exchanger air inlet and at least a portion of the heat exchanger air outlet are disposed above a horizontal plane containing the sprocket axis.

According to some implementations, a throttle body has a throttle valve. The throttle valve is rotatable about a throttle valve rotation axis. The forward portion of the heat exchanger extends longitudinally forward of the throttle valve axis.

According to some implementations, the heat exchanger forms at least a portion of the forward portion of the tunnel.

According to some implementations, the heat exchanger includes a top part and a bottom part. At least one of the top and bottom parts define a recess. The top and bottom parts define therebetween a passage formed in part by the recess. The heat exchanger air inlet fluidly communicates with the heat exchanger air outlet via the passage.

According to some implementations, the heat exchanger air inlet is disposed forwardly of the heat exchanger air outlet.

According to some implementations, an airbox fluidly communicates the heat exchanger with the engine. The airbox includes an airbox inlet fluidly communicating with the heat exchanger air outlet and an airbox outlet fluidly communicating with the engine air inlet.

According to some implementations, the airbox is disposed over a portion of the heat exchanger, the portion of the heat exchanger including the heat exchanger air outlet.

According to some implementations, the airbox outlet is defined in a front portion of the airbox.

According to some implementations, the heat exchanger is a first heat exchanger. A second heat exchanger is connected to the tunnel at least in part rearwardly of the first heat exchanger. The first and second heat exchangers are fluidly separate.

According to some implementations, a third heat exchanger is connected to the tunnel forwardly of the second heat exchanger. The third heat exchanger is at least one of: disposed forwardly and disposed downwardly of the first heat exchanger, the first and third heat exchangers being fluidly separate.

According to another aspect of the present technology, there is provided a snowmobile having a frame including a tunnel. The tunnel has an inverted U-shape and includes a top portion, a left side portion and a right side portion. The top, left side and right side portions at least partly enclose a space. At least one ski is connected to the frame. An engine is supported by the frame. A rear suspension assembly is connected to the tunnel. A drive track is disposed around the rear suspension assembly and at least in part disposed in the space enclosed by the tunnel. The drive track is operatively connected to the engine. An air intake system supplies air from the atmosphere to the engine air inlet. The air intake system has a heat exchanger surface being at least one of disposed in the space and disposed adjacent to the space. Air flowing through the intake system to the engine contacts the heat exchanger surface to be cooled thereby before entering the engine.

According to some implementations, the heat exchanger surface forms a part of the top portion of the tunnel.

According to some implementations, the heat exchanger surface is disposed in a gap defined in the top portion of the tunnel.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle, such as a heat exchanger assembly for example, should be understood as they would be understood when these components or sub-assemblies are mounted to the vehicle, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
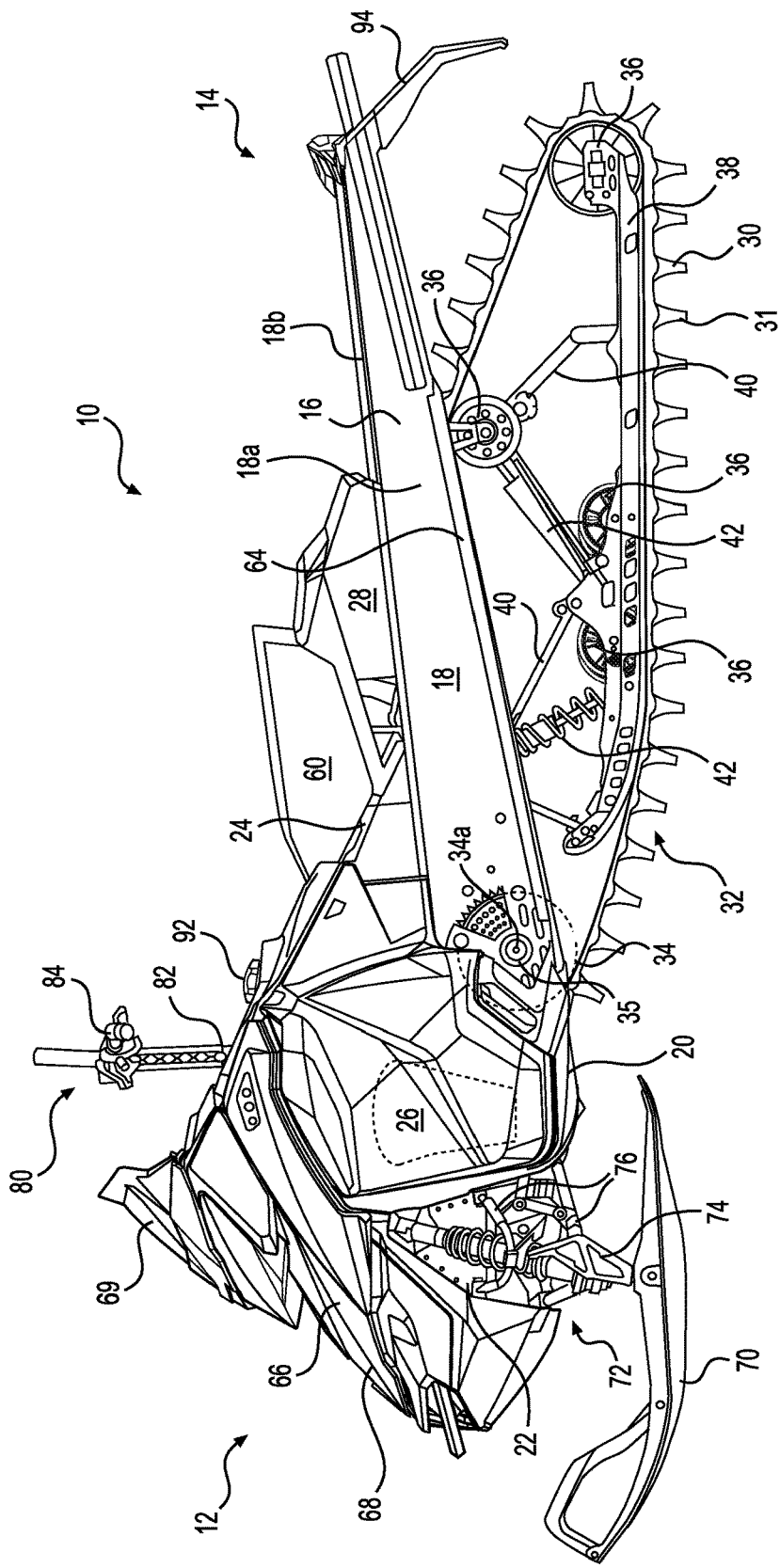
FIG. 1 is a left side elevation view of a snowmobile.
Figure 2:
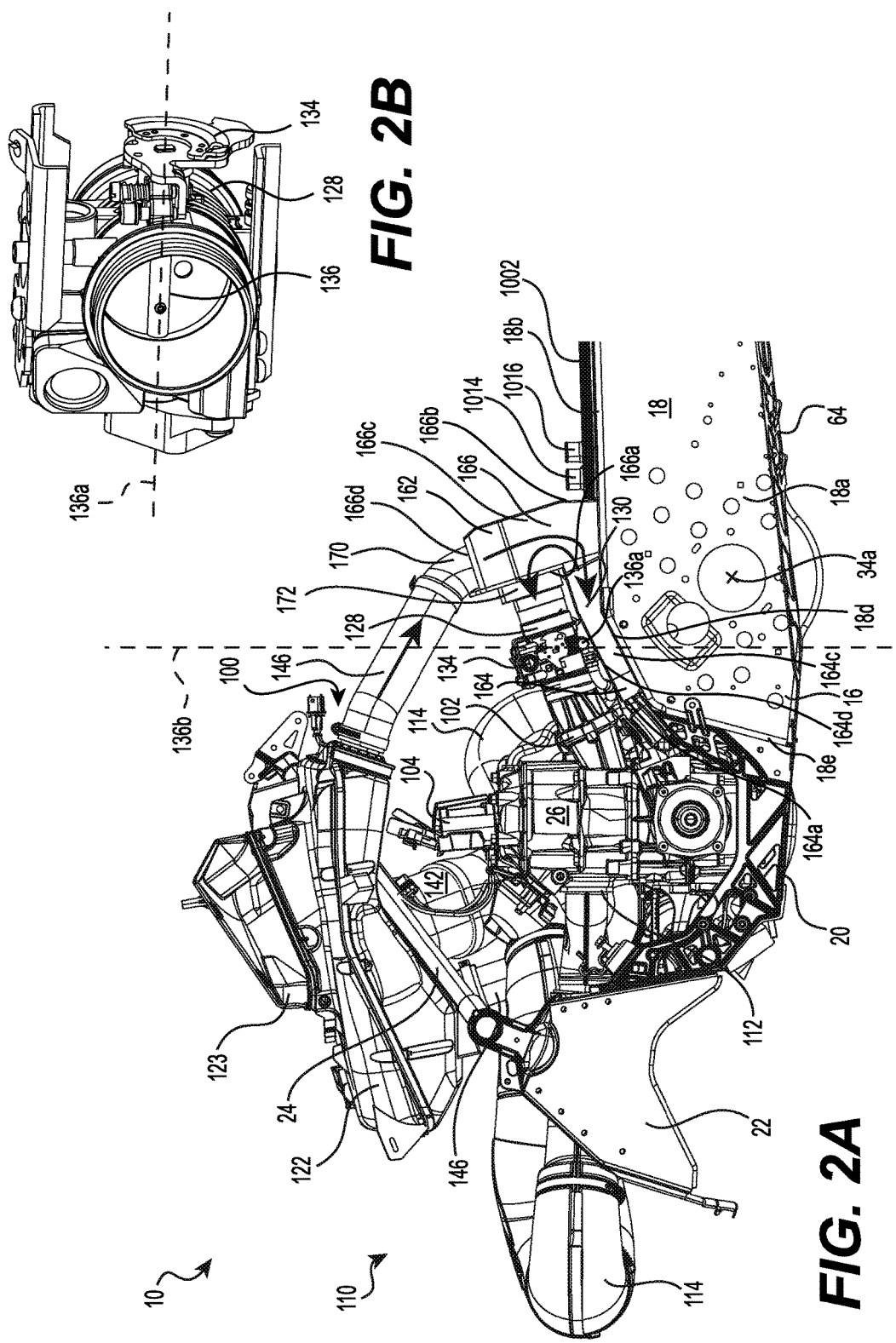
FIG. 2A is a left side elevation view of a portion of the snowmobile of FIG. 1 showing a front portion of the frame and a powerpack including an engine.
FIG. 2B is a perspective view taken from a front, right side of a throttle body of the snowmobile of FIG. 1.
Figure 3:
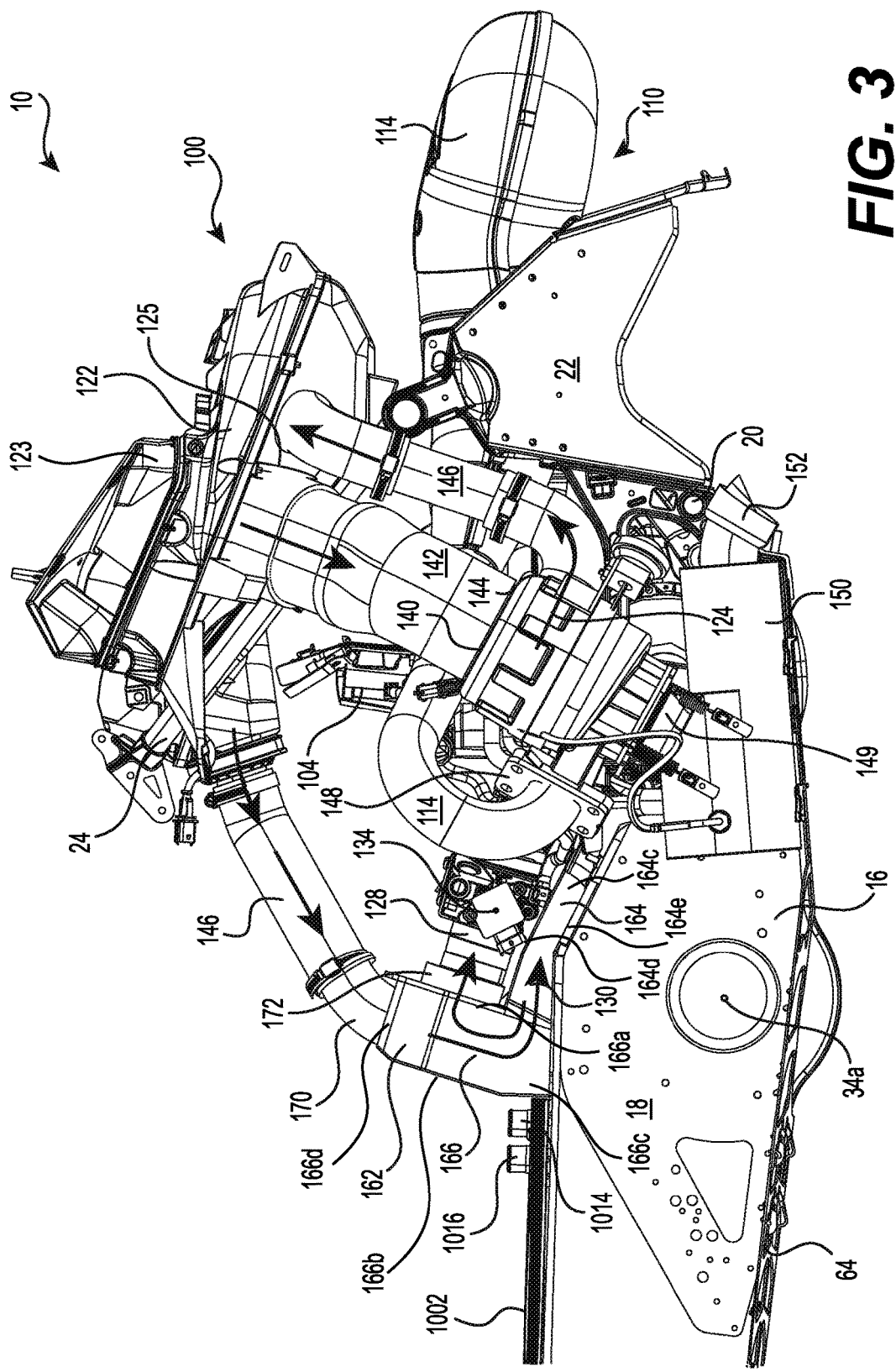
FIG. 3 is a right side elevation view of the snowmobile portion of FIG. 2A.

With reference to FIG. 1, a snowmobile 10 includes a forward end 12 and a rearward end 14. The snowmobile 10 includes a vehicle body in the form of a frame or chassis 16 which, as can be seen in FIGS. 2A and 3, includes a tunnel 18, an engine cradle portion 20, a front suspension module 22 and an upper structure 24.

An internal combustion engine 26 (schematically illustrated in FIG. 1) is carried in an engine compartment defined in part by the engine cradle portion 20 of the frame 16. A fuel tank 28, supported above the tunnel 18, supplies fuel to the engine 26 for its operation. The engine 26 receives air from an air intake system 100 (FIG. 2) including an intake heat exchanger 130 (FIG. 2A). Air flowing into the engine 26 is first cooled by circulating through the intake heat exchanger 130 as will be described in greater detail below.

An endless drive track 30 is positioned at the rear end 14 of the snowmobile 10. The drive track 30 is disposed generally under the tunnel 18, and is operatively connected to the engine 26 through a belt transmission system (not shown) and a reduction drive (not shown). The endless drive track 30 is driven to run about a rear suspension assembly 32 connected to the frame 16 for propulsion of the snowmobile 10. The endless drive track 30 has a plurality of lugs 31 extending from an outer surface thereof to provide traction to the track 30.

The rear suspension assembly 32 includes drive sprockets 34, idler wheels 36 and a pair of slide rails 38 in sliding contact with the endless drive track 30. The drive sprockets 34 are mounted on a drive axle 35 and define a sprocket axis 34a. The slide rails 38 are attached to the tunnel 18 by front and rear suspension arms 40 and shock absorbers 42. It is contemplated that the snowmobile 10 could be provided with a different implementation of a rear suspension assembly 32 than the one shown herein.

A straddle-type seat 60 is positioned atop the fuel tank 28. A fuel tank filler opening covered by a cap 92 is disposed on the upper surface of the fuel tank 28 in front of the seat 60. It is contemplated that the fuel tank filler opening could be disposed elsewhere on the fuel tank 28. The seat 60 is adapted to accommodate a driver of the snowmobile 10. The seat 60 could also be configured to accommodate a passenger. A footrest 64 is positioned on each side of the snowmobile 10 below the seat 60 to accommodate the driver's feet.

At the front end 12 of the snowmobile 10, fairings 66 enclose the engine 26 and the belt transmission system, thereby providing an external shell that not only protects the engine 26 and the transmission system, but can also make the snowmobile 10 more aesthetically pleasing. The fairings 66 include a hood 68 and one or more side panels which can be opened to allow access to the engine 26 and the belt transmission system when this is required, for example, for inspection or maintenance of the engine 26 and/or the transmission system. A windshield 69 connected to the fairings 66 acts as a wind screen to lessen the force of the air on the rider while the snowmobile 10 is moving.

Two skis 70 positioned at the forward end 12 of the snowmobile 10 are attached to the front suspension module 22 of the frame 16 through a front suspension assembly 72. The front suspension module 22 is connected to the front end of the engine cradle portion 20. The front suspension assembly 72 includes ski legs 74, supporting arms 76 and ball joints (not shown) for operatively connecting to the respective ski leg 74, supporting arms 76 and a steering column 82.

A steering assembly 80, including the steering column 82 and a handlebar 84, is provided generally forward of the seat 60. The steering column 82 is rotatably connected to the frame 16. The lower end of the steering column 82 is connected to the ski legs 74 via steering rods (not shown). The handlebar 84 is attached to the upper end of the steering column 82. The handlebar 84 is positioned in front of the seat 60. The handlebar 84 is used to rotate the steering column 82, and thereby the skis 70, in order to steer the snowmobile 10. A throttle operator (not shown) in the form of a thumb-actuated throttle lever is mounted to the right side of the handlebar 84. Other types of throttle operators, such as a finger-actuated throttle lever and a twist grip, are also contemplated. A brake actuator (not indicated), in the form of a hand brake lever, is provided on the left side of the handlebar 84 for braking the snowmobile 10 in a known manner. It is contemplated that the windshield 69 could be connected directly to the handlebar 84.

At the rear end of the snowmobile 10, a snow flap 94 extends downward from the rear end of the tunnel 18. The snow flap 94 protects against dirt and snow that can be projected upward from the drive track 30 when the snowmobile 10 is being driven. It is contemplated that the snow flap 94 could be omitted.

The snowmobile 10 includes other components such as a display cluster, and the like. As it is believed that these components would be readily recognized by one of ordinary skill in the art, further explanation and description of these components will not be provided herein.

Figure 12:
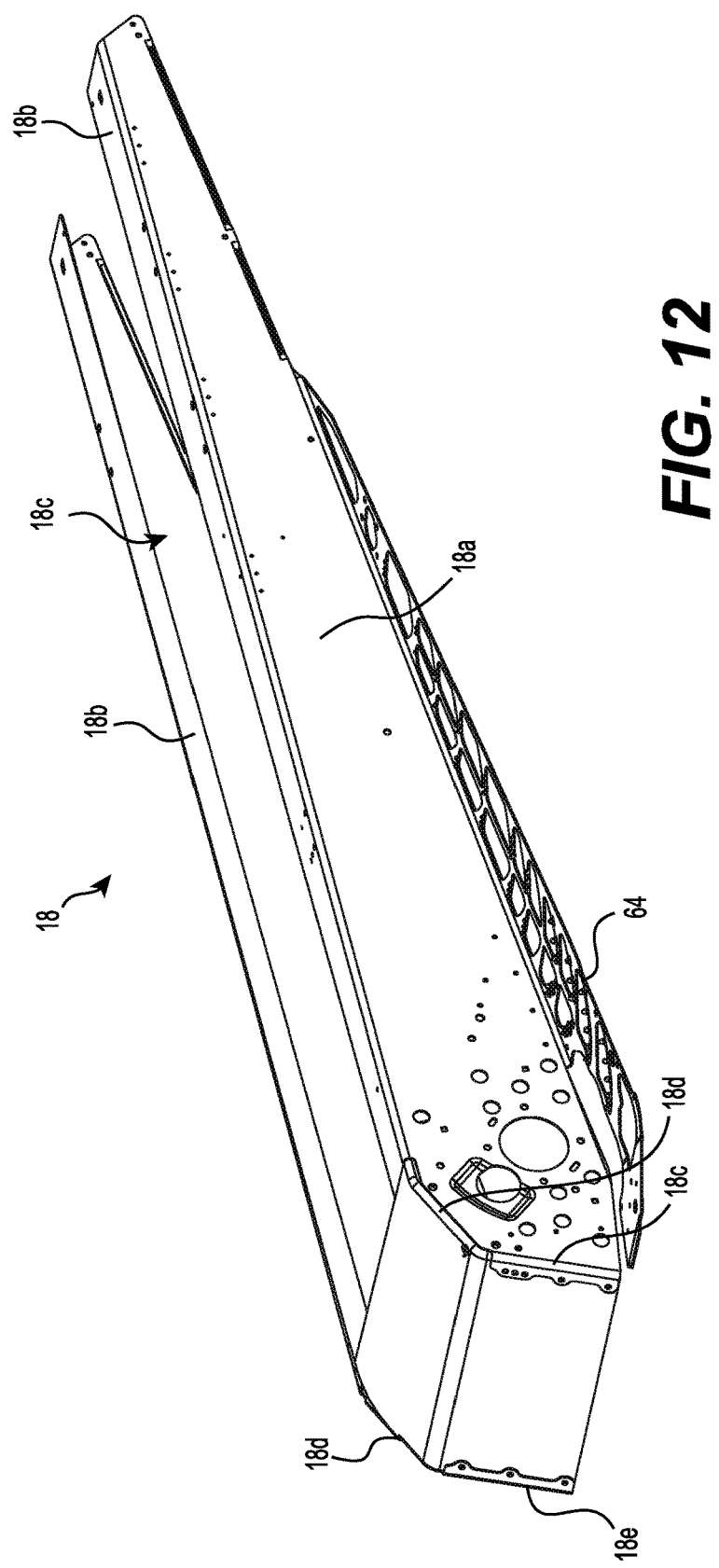
FIG. 12 is a perspective view taken from a front, left side of a tunnel of the snowmobile of FIG. 1 shown in isolation.
Figure 13:
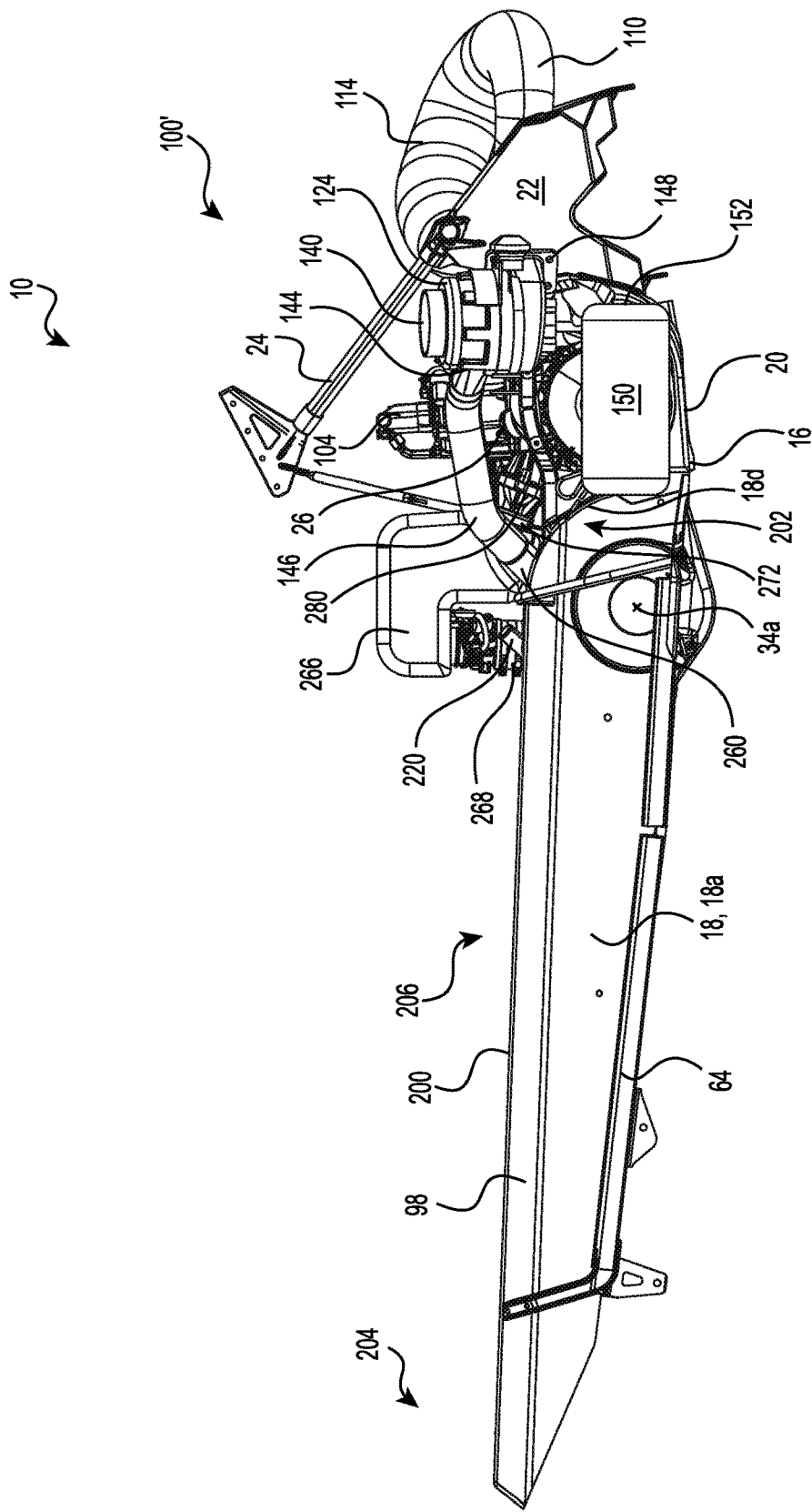
FIG. 13 is a right side elevation view of a portion of the snowmobile of FIG. 1 showing a portion of the frame, the powerpack including the engine and another implementation of an air intake system, and a heat exchanger assembly.
Figure 14:
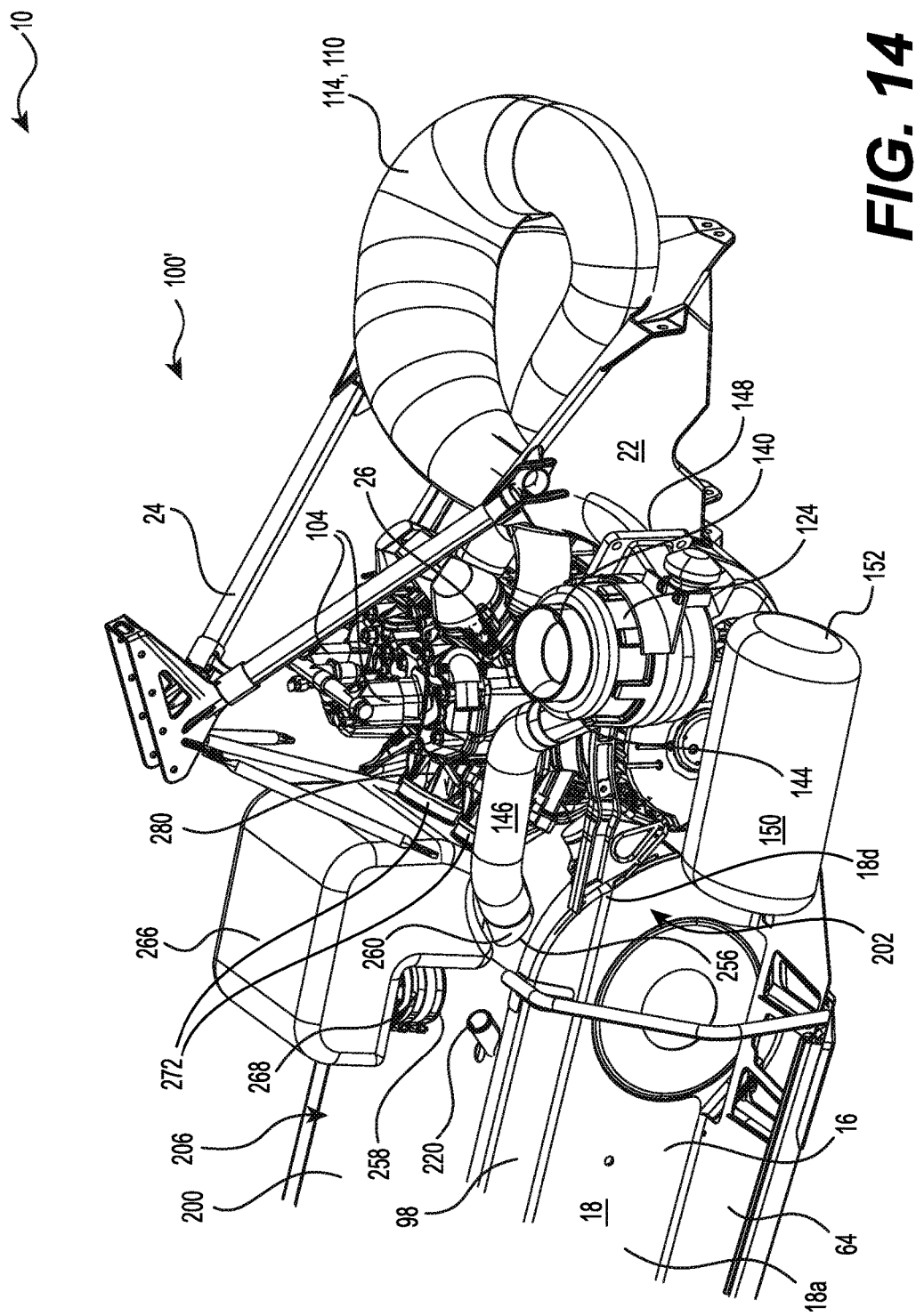
FIG. 14 is a perspective view, taken from a front, top, right side of the snowmobile portion of FIG. 13.

With reference to FIG. 12, the tunnel 18 will now be described in more detail. The inverted U-shaped tunnel 18 is formed by a left side portion 18a and a right side portion 18a. Each side portion 18a is made from a bent piece of sheet metal. Each side portion 18a has a horizontally extending top portion 18b. The top portions 18b of the left and right sides define a longitudinally extending gap 18c therebetween. Each side portion 18a is bent laterally outwardly at its bottom edge to form a part of the corresponding footrest 64. Each side portion 18a has an upper front edge 18d that extends downwards and forwards from the front end of the top portion 18b, and a lower front edge 18e that extends downwards and forwards from the upper front edge 18d to the front end of the bottom edge. The upper and lower front edges 18d, 18e of the left and right side portions 18a form the front of the tunnel 18.

A space 19 is defined by the left and right side portions 18a, and the left and right top portions 18b. The upper portion of the drive track 30 is disposed at least partly in the space 19 as can be seen clearly in FIG. 7. The drive sprockets 34 and the drive axle 35 are disposed in a forward portion of the space 19 enclosed by the forward portion of the tunnel 18.

With reference to FIGS. 2A to 3, the engine 26 is an inline, two-cylinder, four-stroke, internal combustion engine. The two cylinders of the engine 26 are oriented with their cylindrical axes disposed vertically. It is contemplated that the engine 26 could be configured differently. For example, the engine 26 could have more or less than two cylinders, and the cylinders could be arranged in a V-configuration instead of in-line. It is contemplated that the engine 26 could be a two-stroke internal combustion engine, a carbureted engine, or any other suitable engine capable of propelling the snowmobile 10.

The engine 26 receives air from the air intake system 100 via an engine air inlet 102 defined in the rear portion of each cylinder of the engine 26. Each air inlet 102 is connected to a throttle body 128 of the air intake system 100. The throttle body 128 comprises a throttle valve 136 (FIG. 2B) which rotates about a rotation axis 136a to regulates the amount of air flowing through the throttle body 128 into the corresponding cylinder of the engine 26. A throttle valve actuator 134, is operatively connected to the throttle valve 136 to change the position of the throttle valve 136 and thereby adjust the opening of the throttle valve 136 with operation of the throttle lever on the handlebar 84. It is also contemplated that the throttle valve actuator 134 could be in the form of an electric motor. The electric motor could change the position of the throttle valve 136 based on input signals received from an electronic control module (not shown) which in turn receives inputs signals from a position sensor associated with the throttle lever on the handlebars 84. Further details regarding such drive-by wire throttle systems can be found in International Patent Application No. PCT/US2013/048803 filed on Jun. 29, 2013, the entirety of which is incorporated herein by reference. The intake system 100 includes a heat exchanger 130 for cooling intake as will be described in greater detail below.

The engine 26 is fluidly connected to the fuel tank 28 via a left fuel injector 104 connected to the top of the left cylinder and a right fuel injector 104 connected to the top of the right cylinder.

The fuel-air mixture in each of the left and right cylinders of the engine 26 is ignited by an ignition system (not shown). Engine output power, torque and engine speed are determined in part by the ignition timing, and also by various characteristics of the fuel-air mixture such as its composition, temperature, pressure and the like.

Exhaust gases resulting from the combustion process are expelled from the engine 26 via an exhaust system 110. An exhaust outlet 112 is defined in the front portion of each cylinder of the engine 26. The exhaust system 110 includes an exhaust conduit 114 which is connected to the exhaust outlets 112 of both cylinders and extends forwardly therefrom to direct exhaust gases out of the engine 26.

Liquid coolant is also circulated through the engine 26 in order to cool the engine 26. The coolant, which gets heated by absorbing heat from the engine 26, is cooled by circulating through a coolant heat exchanger arrangement that includes a front heat exchanger assembly 1000 and a heat exchanger assembly 1002 (FIGS. 4 and 11) connected to the tunnel 18.

With reference to FIGS. 11A to 11D, the front heat exchanger 1000 has a body 1004 defining an internal volume, an outlet pipe 1006 and an inlet pipe 1008. The pipes 1006, 1008 are welded to the body 1004. Fins 1010 are formed on the back of the body 1004. The front heat exchanger 1000 extends from the left side lower front edge 18d to the right side front edge 18d of the tunnel 18, thus defining in part the front of the tunnel 18.

The heat exchanger 1002 is disposed on the top portions 18a over the gap 18c of the tunnel 18. The heat exchanger assembly 1002 thus defines partly a top of the tunnel 18. The heat exchanger 1002 has a body 1012, an inlet pipe 1014, an outlet pipe 1016, and a connector 1018. Fins 1020 are formed on the bottom of the body 1012. The body 1012 is formed by being extruded. The extrusion process forms two passages 1022, 1024. A connector 1018, also formed by extrusion, is connected to the back of the two passages 1022, 1024 to fluidly connect the two together thereby forming a single passage. The passages 1022, 1024 are capped at their front end. The inlet pipe 1014 is welded at a front of the passage 1022 and the outlet pipe 1016 is welded at a front of the passage 1024.

A pipe 1014a connects the inlet pipe 1014 of the heat exchanger assembly 1002 to the engine 26 to receive hot coolant from the engine 26. Another pipe 1016a connects the outlet pipe 1016 of the heat exchange assembly 1002 to the inlet pipe 1008 of the heat exchanger assembly 1000 to allow coolant to flow from the heat exchanger assembly 1002 to the heat exchanger assembly 1000. Another pipe (not shown) connects the outlet pipe 1006 of the heat exchanger assembly 1000 to the engine to return cooled coolant to the engine.

During operation of the snowmobile 10, coolant flows from the engine 26 to the heat exchanger 1002. In the heat exchanger 1002, coolant first flows through the passage 1022, then through the connector 1018, and then through the passage 1024. From the passage 1024 the coolant flows to the heat exchanger 1000. From the heat exchanger 1000, the coolant is returned to the engine 26.

The coolant in the heat exchangers 1000, 1002 is cooled by a combination of air flowing along the surfaces of the heat exchanger assemblies 1000, 1002 and snow being projected on the surfaces of the heat exchanger assemblies 1000, 1002 by the drive track of the snowmobile.

The air intake system 100 will now be described in more detail with reference to FIGS. 2A to 3. The air intake system 100 includes a secondary airbox 122, an air compressor 124, and an intake heat exchanger 130, in addition to the left and right throttle bodies 128 mentioned above.

Ambient air enters the secondary airbox 122, and then flows through the secondary airbox 122 into the air compressor 124 which compresses the air. Compressed air from the air compressor 124 is then directed through the heat exchanger 130 into the left and right throttle bodies 128. From the left throttle body 128, the air enters the left cylinder of the engine 26 via the left engine air inlet 102. From the right throttle body 128, the air enters the right cylinder of the engine 26 via the right engine air inlet 102.

The secondary airbox 122 is disposed above the front suspension module and extends rearwards above the engine 26. Air enters the secondary airbox 122 through an inlet 123 in the front portion of the snowmobile 10. An outlet 125 is defined in the middle portion on the right side of the secondary airbox 122. A conduit 142 connects the outlet 125 to the air compressor 124 disposed on the right side of the engine 26. It is contemplated that the secondary airbox 122 could be omitted and that ambient air could directly enter into the turbocharger inlet 140 without going through the secondary airbox 122.

In the illustrated implementation, the air compressor 124 is in the form of a turbocharger. The turbocharger 124 includes a compressor turbine (not shown) and an exhaust turbine (not shown). Air flowing past the rotating compressor turbine is compressed thereby. The rotation of the compressor turbine is powered by the exhaust turbine, which is in turn rotated by exhaust gases expelled from the engine 26 and being directed to flow over the blades of the exhaust turbine.

The turbocharger 124 includes an ambient air inlet 140 connected to the secondary airbox 122 via the air conduit 142. The turbocharger 124 includes a compressed air outlet 144 connected to a conduit 146. The conduit 146 fluidly connects the turbocharger 124 with the heat exchanger 130. The conduit 146 extends upwards from the turbocharger 124 into the secondary airbox 122, then rearwards through the secondary airbox 122, and then downwards into the heat exchanger 130. The secondary airbox 122 surrounds a portion of the conduit 146 but the portion of the conduit 146 is sealed from the secondary airbox 122. It is contemplated that the conduit 146 could not pass through the interior of the secondary airbox 122.

Figure 4:
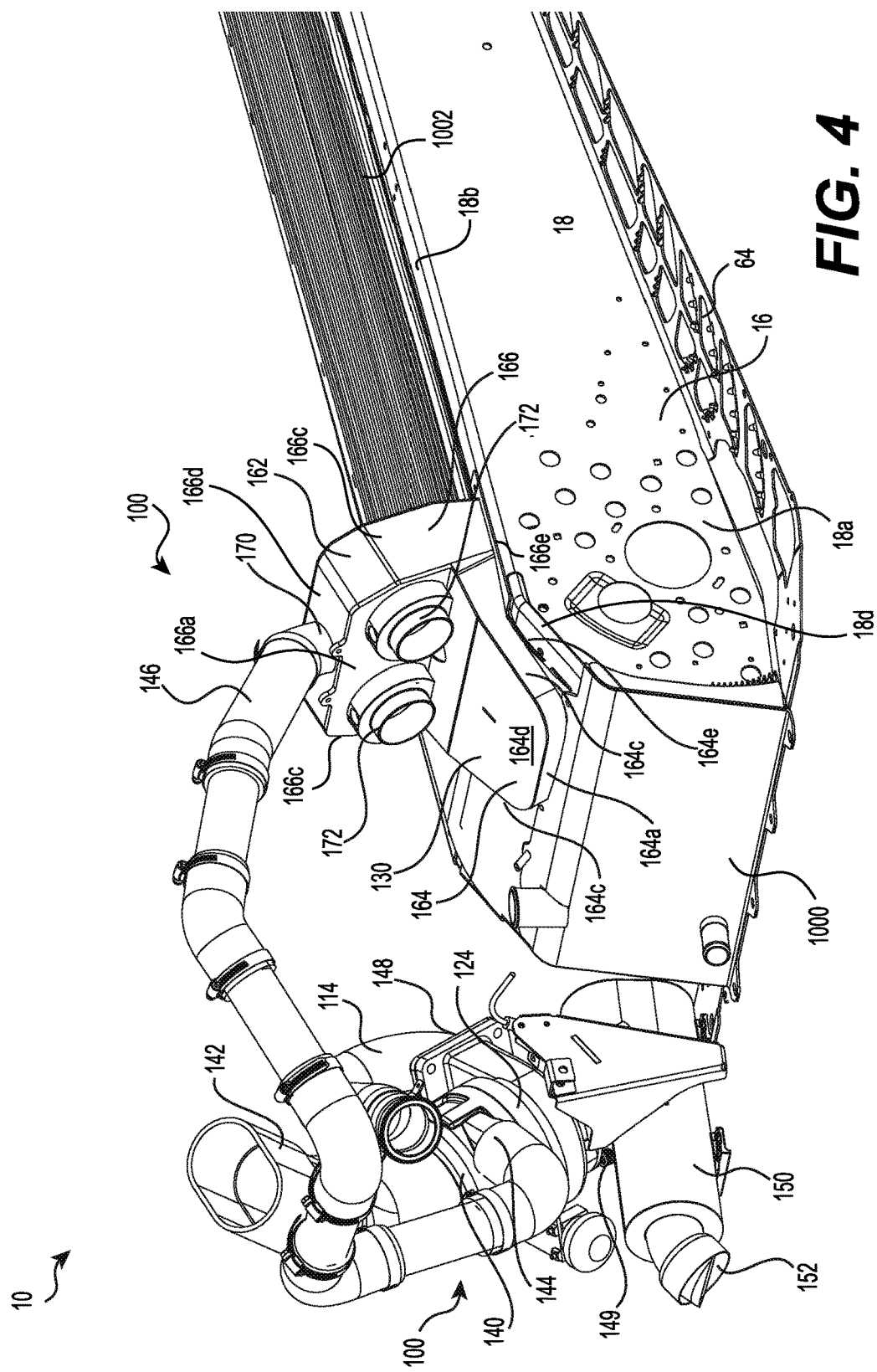
FIG. 4 is a perspective view taken from a front, left side of the snowmobile portion of FIG. 2A with the engine and a portion of the frame.
Figure 5:
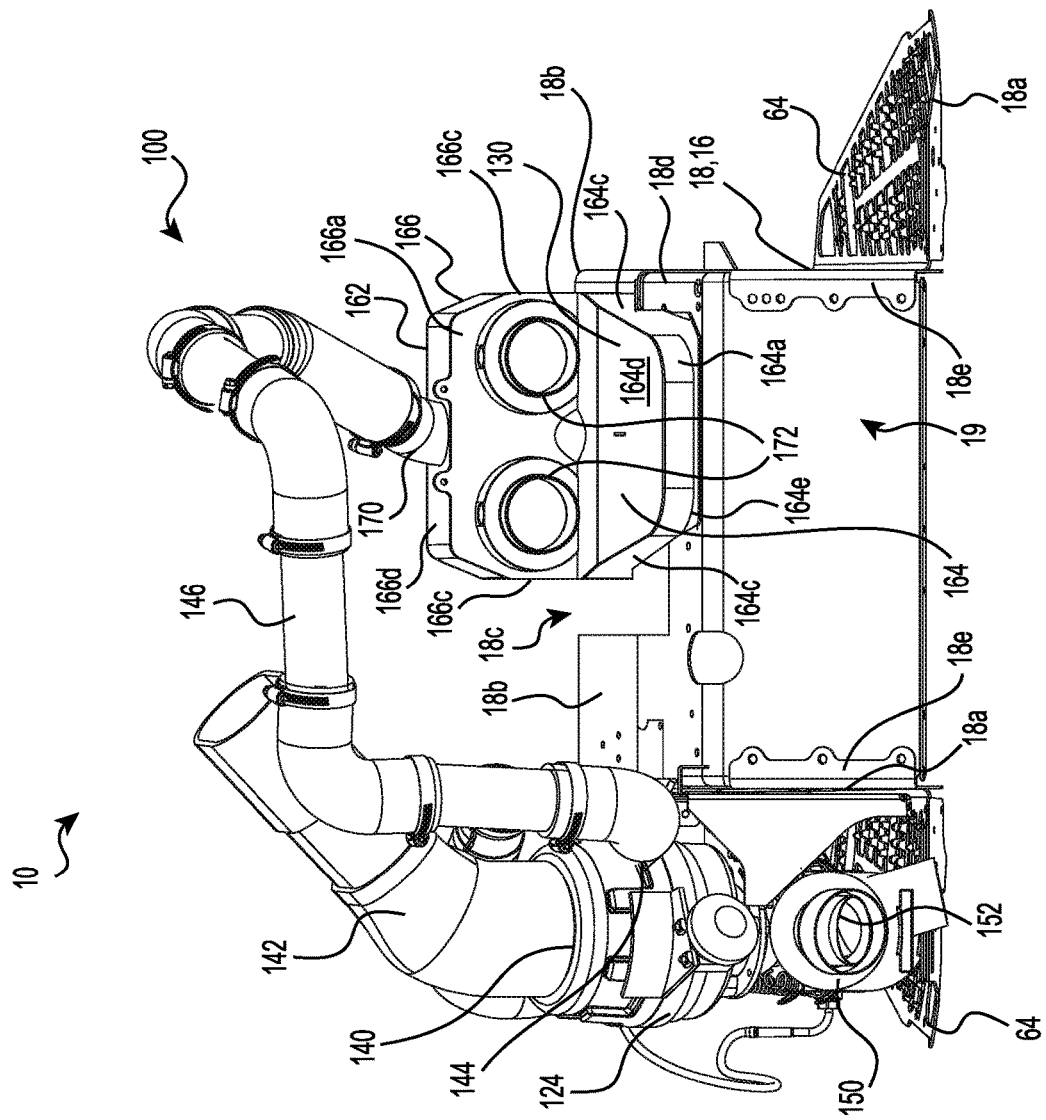
FIG. 5 is a front elevation view of the snowmobile elements of FIG. 4 with the engine coolant heat exchanger being removed for clarity.
Figure 6:
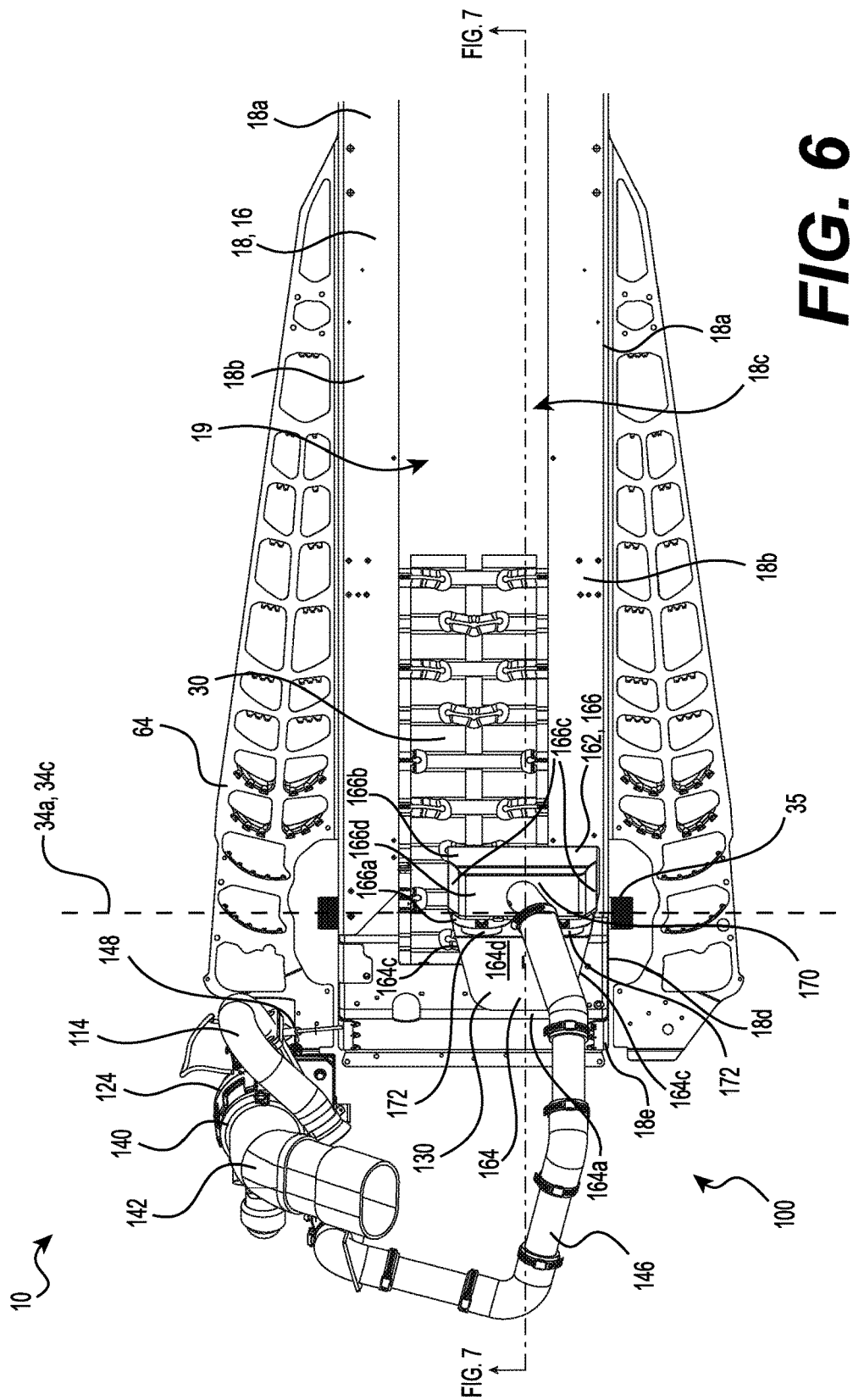
FIG. 6 is a top plan view of a portion of the air intake system and a portion of the tunnel of the snowmobile of FIG. 1 with the drive track and the drive axle disposed under the portion of the tunnel.

The turbocharger 124 is connected to the exhaust system 110 for powering the exhaust turbine for compressing air. The turbocharger 124 includes an exhaust gas inlet 148 connected to the exhaust conduit 114 for receiving exhaust gases from the exhaust system 110. The turbocharger 124 includes an exhaust gas outlet 149 connected to a muffler 150 for expelling exhaust gases as can be seen in FIG. 4. Exhaust gases expelled from the engine 26 flows through the exhaust conduit 114 and via the exhaust inlet 148 into the exhaust turbine side of the turbocharger 124. After flowing over the exhaust turbine, the exhaust gases flow out via the exhaust gas outlet 149 into the muffler 140, and then through the muffler 150 into the atmosphere via an outlet 152 of the muffler 150.

It is contemplated that the air compressor 124 could be a supercharger, in which the compressor turbine is directly powered by the engine 26. The supercharger would have an ambient air inlet 140 and a compressed air outlet 142 but would not be connected to the exhaust system 110 of the engine 26. It is also contemplated that the air compressor 124 could be omitted, and the heat exchanger 130 could receive air directly from the secondary airbox 122 or from the atmosphere when the secondary airbox 122 is also omitted.

The intake heat exchanger 130 of the implementations illustrated in FIGS. 2A to 13 also provides a voluminous chamber for equalizing air pressure of the airflow entering the engine 26. The heat exchanger 130 is therefore also a primary airbox for the snowmobile 10. The heat exchanger 130 is thus a combined heat exchanger and airbox for entering the engine 26. It is however contemplated that a primary airbox could be formed separately from the heat exchanger 130.

The intake heat exchanger 130 will now be described in detail with reference to FIGS. 2A to 13.

The heat exchanger 130 includes a body 162 having a forward portion 164 and a rearward portion 166. With reference to FIG. 2A, the rearward portion 166 is at least partially rearward of the throttle bodies 128. The forward portion 164 extends below and at least partially forward of the throttle bodies 128 and their common throttle valve axis 136a. A vertical plane 136b containing the axis 136a intersects the heat exchanger 130. The rearward portion 166 of the body 162 forms the airbox.

The heat exchanger 130 is disposed forward of the coolant heat exchanger 1002 and fastened to the tunnel 18. The rearward portion 166 is supported by the left side top 18b and disposed partly over the left portion of the gap 18c. The forward portion 164 extends forward from the rearward portion 166 to the front of the tunnel 18 formed by the upper front edges 18d that extends at a downward and forward angle from the top 18b. It is contemplated that the forward portion could extend further downward than as shown in the figures to the lower front portion formed by the edges 18e. It is contemplated that the heat exchanger 130 could be fastened to the right side portion 18b, or to both top portions 18b. It is contemplated that the heat exchanger 130 could be disposed on the right side of the gap 18c, or over the middle of the gap 18c while being supported by one or both of the top portions 18b. It is also contemplated that the heat exchanger 130 could extend along the entire width of the gap 18c from the left side portion 18a to the right side portion 18a.

Figure 9:
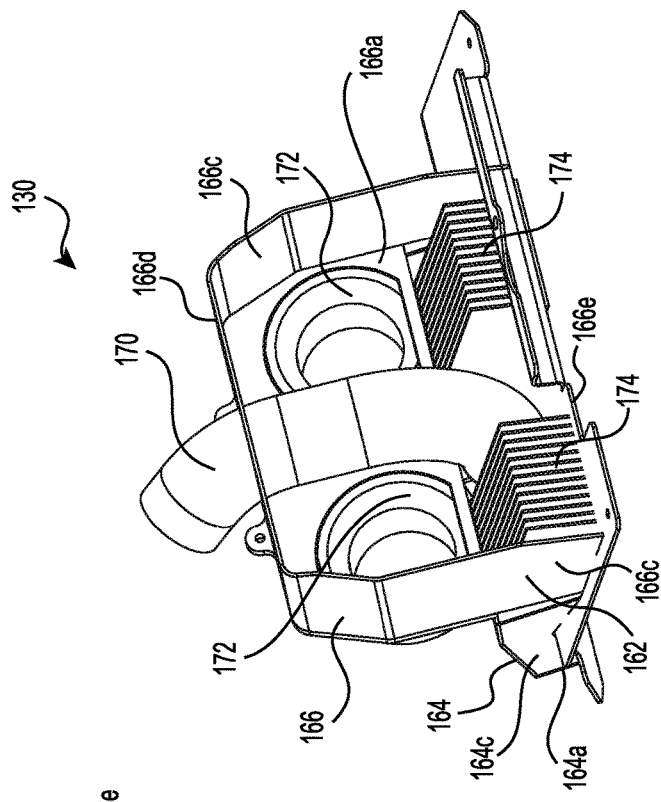
FIG. 9 is a perspective view, taken from a front, left side of an intake heat exchanger of the air intake system of FIG. 6 shown in isolation with a top wall removed for clarity.
Figure 10:
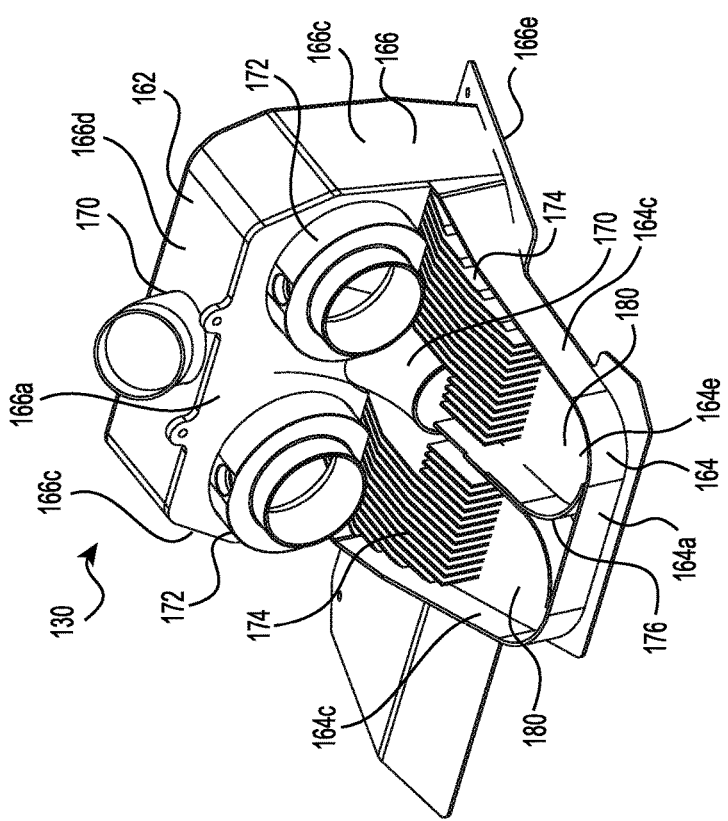
FIG. 10 is a perspective view, taken from a rear, left side of an intake heat exchanger of the air intake system of FIG. 9 with a rear wall being removed for clarity.
Figure 11A:
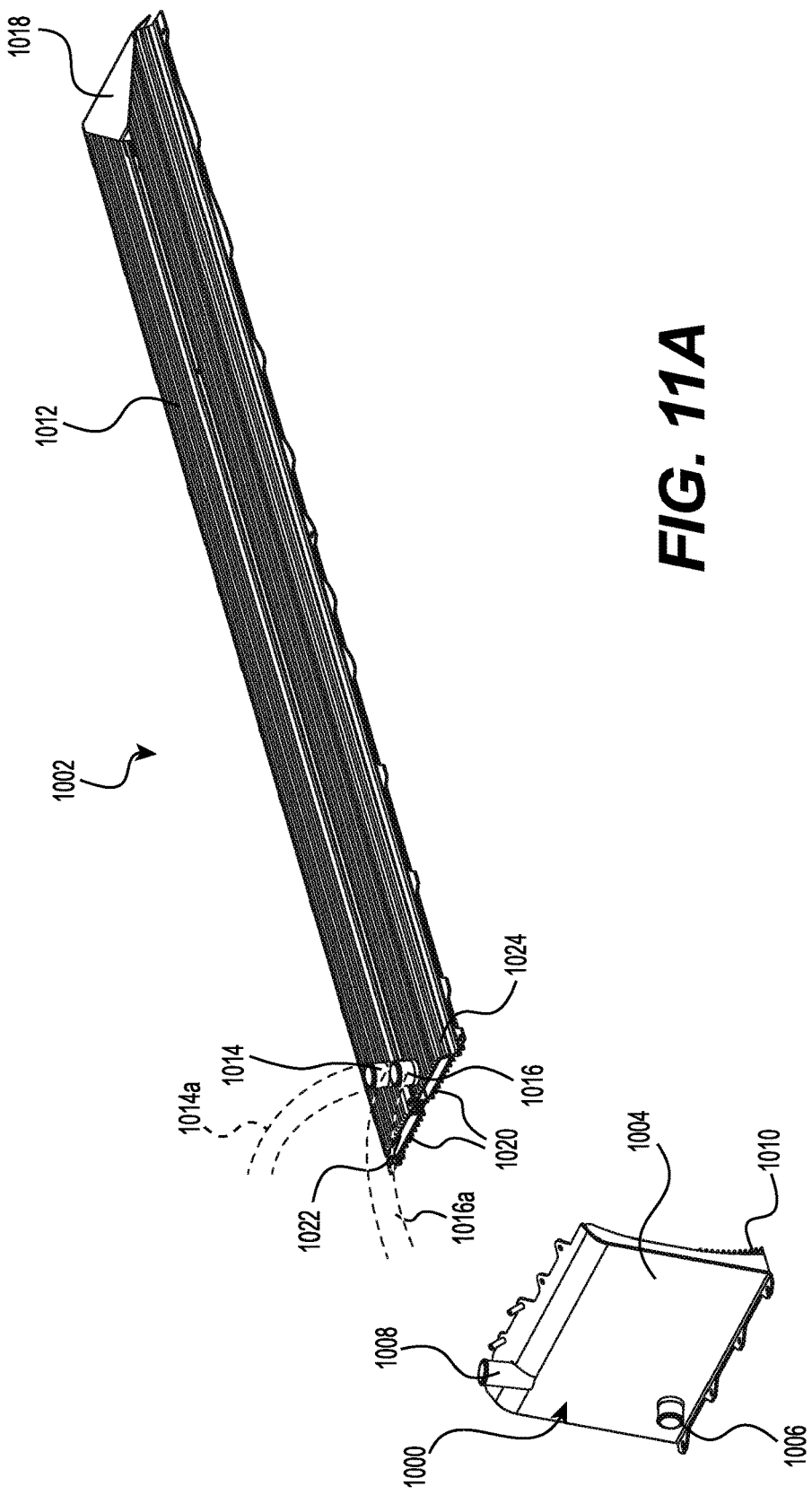
FIG. 11A is a perspective view, taken from a front, left side of the engine coolant heat exchanger of FIG. 4 shown in isolation.
Figure 11B:
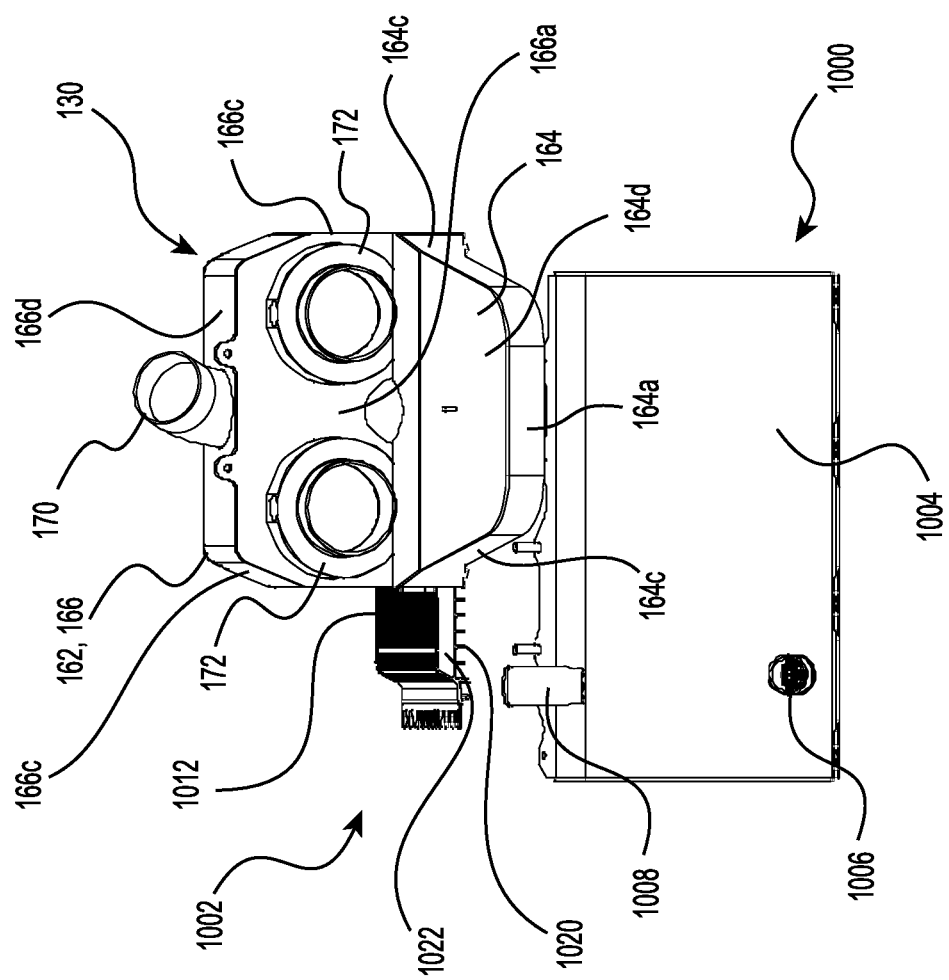
FIG. 11B is a front elevation view of the engine coolant heat exchanger and the intake heat exchanger of FIG. 4.
Figure 11C:
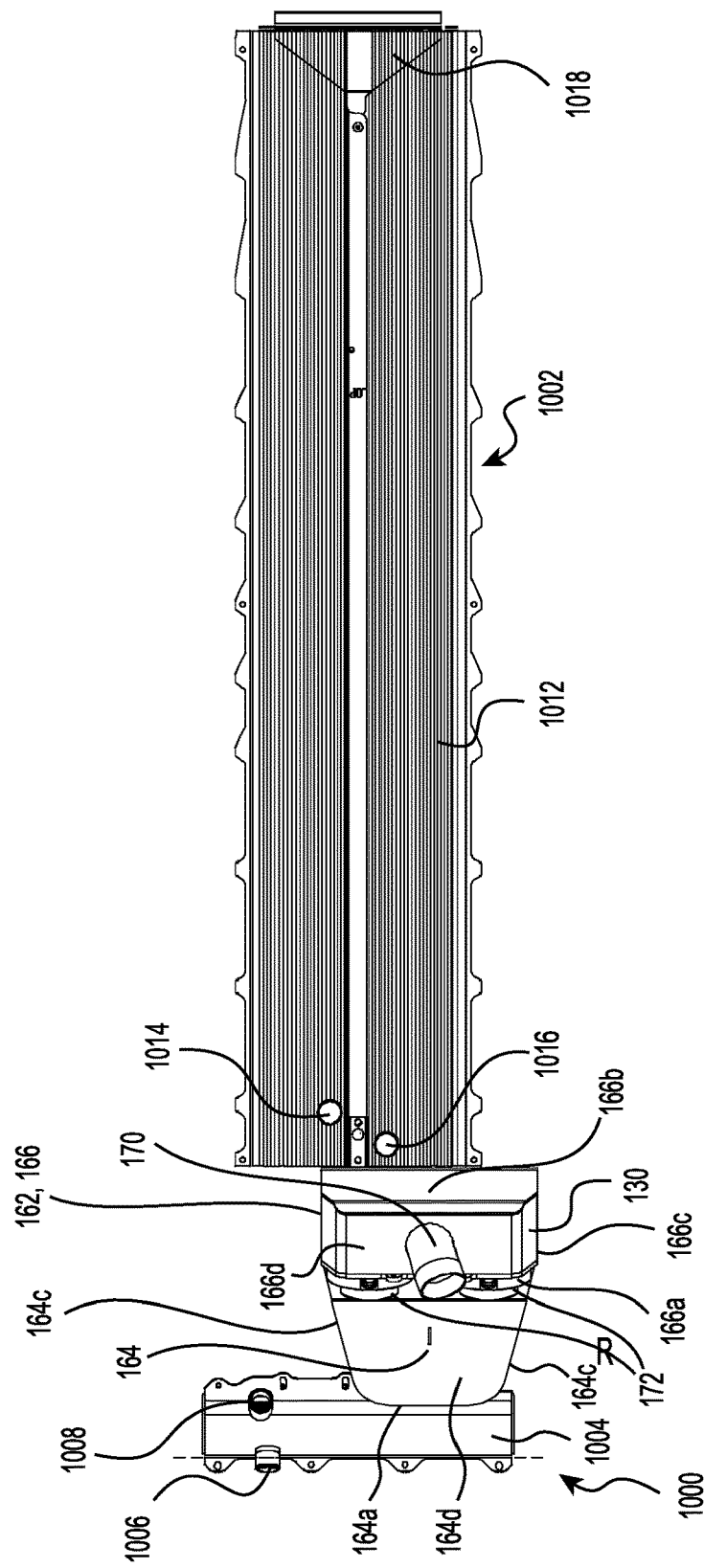
FIG. 11C is a top plan view of the engine coolant heat exchanger and the intake heat exchanger of FIG. 4.
Figure 11D:
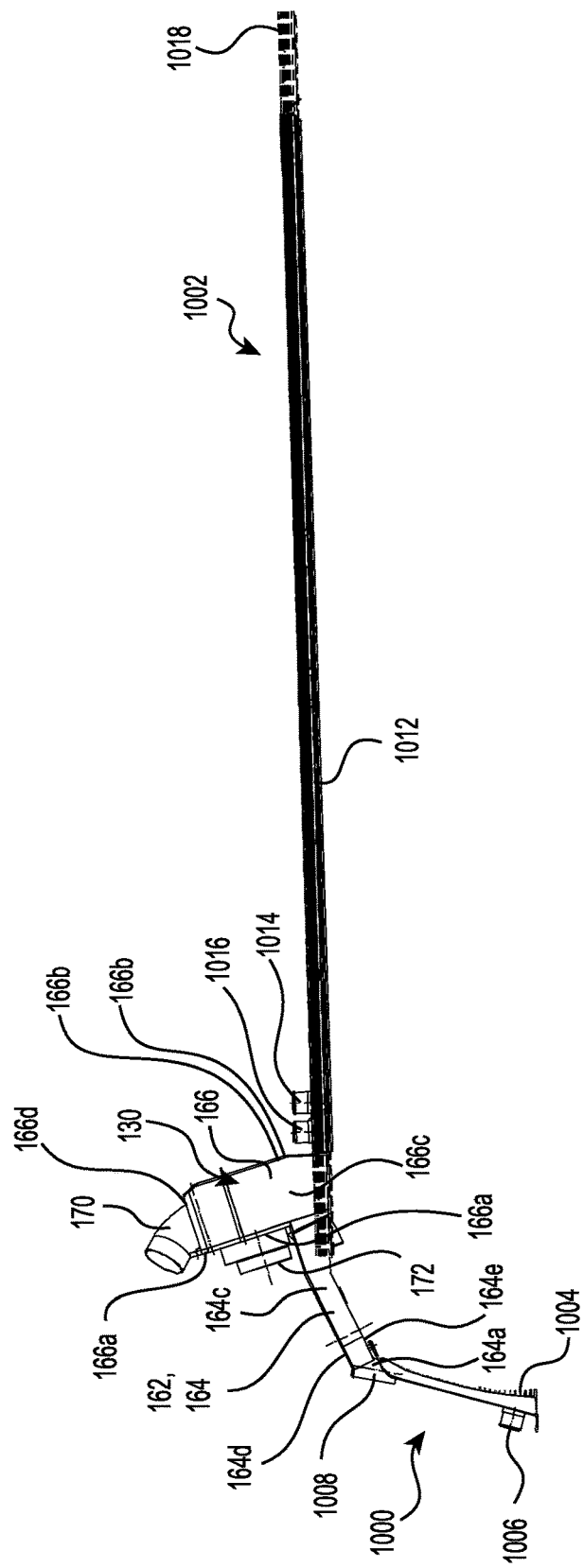
FIG. 11D is a left side elevation view of the engine coolant heat exchanger and the intake heat exchanger of FIG. 4.

With reference to FIGS. 9 and 10, the rearward portion 166 has a front wall 166a, a rear wall 166b, left and right side walls 166c, a top wall 166d and a bottom wall 166e. The left and right side walls 166c are disposed vertically and parallel to each other in the lower portion. An upper portion of the left wall 166c is angled inwards towards the right side wall 166c. An upper portion of the right side wall 166c is angled towards the left side wall 166c. The front surface 166a is angled forwardly and upwardly from the tunnel 18. The top wall 166d is perpendicular to the front wall 166a. The rear wall 166b is parallel to the front wall 166a in the middle portion. An upper portion of the rear wall 166b is angled rearwardly and downwardly from the top wall 166d. A lower portion of the rear wall is disposed vertically.

The height of the rearward portion 166 between the top 166d and bottom walls 166e is larger than its lateral width between the left and right side walls 166c, and its longitudinal depth between the front and rear walls 166a, 166b. The lateral width of the rearward portion 166 is greater than the longitudinal depth of the rearward portion 166. It is contemplated that the lateral width could be smaller than, or equal to, the longitudinal depth. The walls 166a, 166b, 166c, 166d, 166e of the rearward portion 166 define a voluminous interior chamber for expansion of air flowing therein.

An inlet conduit 170 extends partly above the top wall 166d of the rearward portion 166. The conduit 146 is clamped around the portion of the inlet conduit 170 disposed above the top wall 166d. The inlet conduit 170 extends through an aperture 170a formed in the top wall 166d and through the interior volume enclosed by the rearward portion 166 into the forward portion 164.

Two laterally spaced outlets 172 are defined in the front wall 166a of the rearward portion 166 above the forward portion 164. Each outlet 172 is surrounded by a tubular projection projecting forwardly from the front wall 166a. The left outlet 172 is connected to the left cylinder of the engine 26 via the left throttle body 128 and the left air inlet 102. The right outlet 172 is connected to the right cylinder of the engine 26 via the right throttle body 128 and the right air inlet 102. The inlet conduit 170 is disposed laterally between the two outlets 172.

Figure 7:
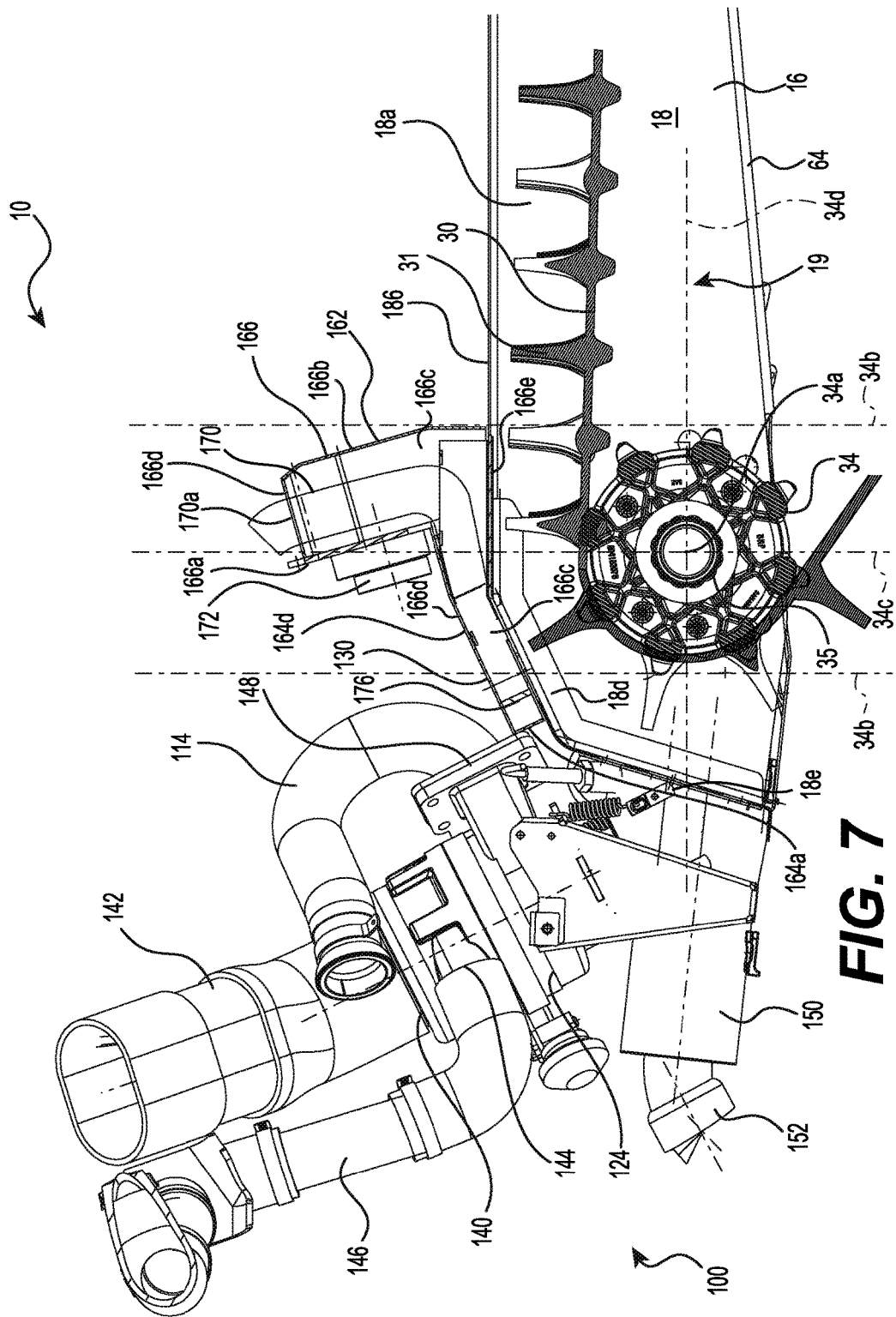
FIG. 7 is a cross-sectional view of the air intake system, tunnel portion, drive track, drive axle and drive sprockets taken along the line 7-7 in FIG. 6.

With reference to FIG. 7, the inlet aperture 170a is disposed longitudinally rearward of a vertical plane 34c containing the sprocket axis 34a. The vertical plane 34a passes through the tubular projection surrounding the outlet 172. The inlet 170 and a portion of the outlet 172 are therefore disposed on opposite sides of the vertical plane 34c. The inlet 170 and the outlets 172 are both disposed vertically above a horizontal plane 344 containing the sprocket axis 34a.

The forward portion 164 of the heat exchanger 130 includes a top wall 164d, a bottom wall 164e, a front wall 164a, and left and right side walls 164c. The bottom wall 164e extends forwardly and downwardly from the bottom wall 166e of the rearward portion 166. The top wall 164d extends from the front wall 166a of the rearward portion 166 to the front wall 164a of the forward portion 164.

The forward portion 164 encloses an interior volume that is smaller than the interior volume enclosed by the rearward portion 166. The height of the forward portion 164 between the top wall 164d and the bottom wall 164e is smaller than that of the rearward portion 166. The lateral spacing between the left and right side walls 164c of the forward portion 164 decreases towards the front wall 164a of the forward portion 164. The height of the forward portion 164 is smaller than the lateral spacing between the left and right side walls 164c. The constricted spacing between the top and bottom walls 164d, 164e of the forward portion 164 ensures that a majority of the air flowing within the interior volume defined by the forward portion 164 comes in contact with the bottom wall 164e to be cooled thereby.

An internal wall 176 separates the interior of the forward portion 164 into a left chamber 180 and a right chamber 180. The internal wall 176 is disposed forward of the inlet conduit 170. The internal wall 176 extends longitudinally from the front of the inlet conduit 170 towards the front wall 164a of the forward portion 164. A left branch of the internal wall 176 branches off towards left side wall 164c of the forward portion 164. A right branch of the internal wall 176 branches off towards right side wall 164c of the forward portion 164.

A number of longitudinally extending fins 174 are project upwards from the inner surface of the bottom wall 164e. The fins 174 enhance cooling of the air flowing through the interior volume of the forward portion 164. In each chamber 180, some of the longitudinal fins 174 are in front of the inlet conduit 170, while the remaining fins 174 are disposed laterally outwardly of the inlet conduit 170.

Compressed air from the turbocharger 124 flows through the inlet conduit 170 into the interior volume of the forward portion 164. A portion of the airflow flows forward from the inlet conduit 176 into the right chamber 180 flowing past the fins 174. The right branch of the internal wall 176 then directs this airflow rightward and then rearward past the fins 174 and the front wall 166a of the rearward portion 166 into the interior volume enclosed thereby. Similarly, a portion of the airflow flows forward from the inlet conduit 176 into the left chamber 180 flowing past the fins 174. The left branch of the internal wall 176 then directs this airflow leftward and then rearward past the laterally outward fins 174 and the front wall 166a of the rearward portion 166 into the interior volume enclosed thereby. The left and right airflows partially mix while flowing upwards in the interior volume of the rearward portion 166 before flowing out through either the left or the right heat exchanger outlet 172. The voluminous chamber defined by the rearward portion 166 enables equalization of pressure and temperature of air flowing therethrough to the outlet 172.

Figure 8:
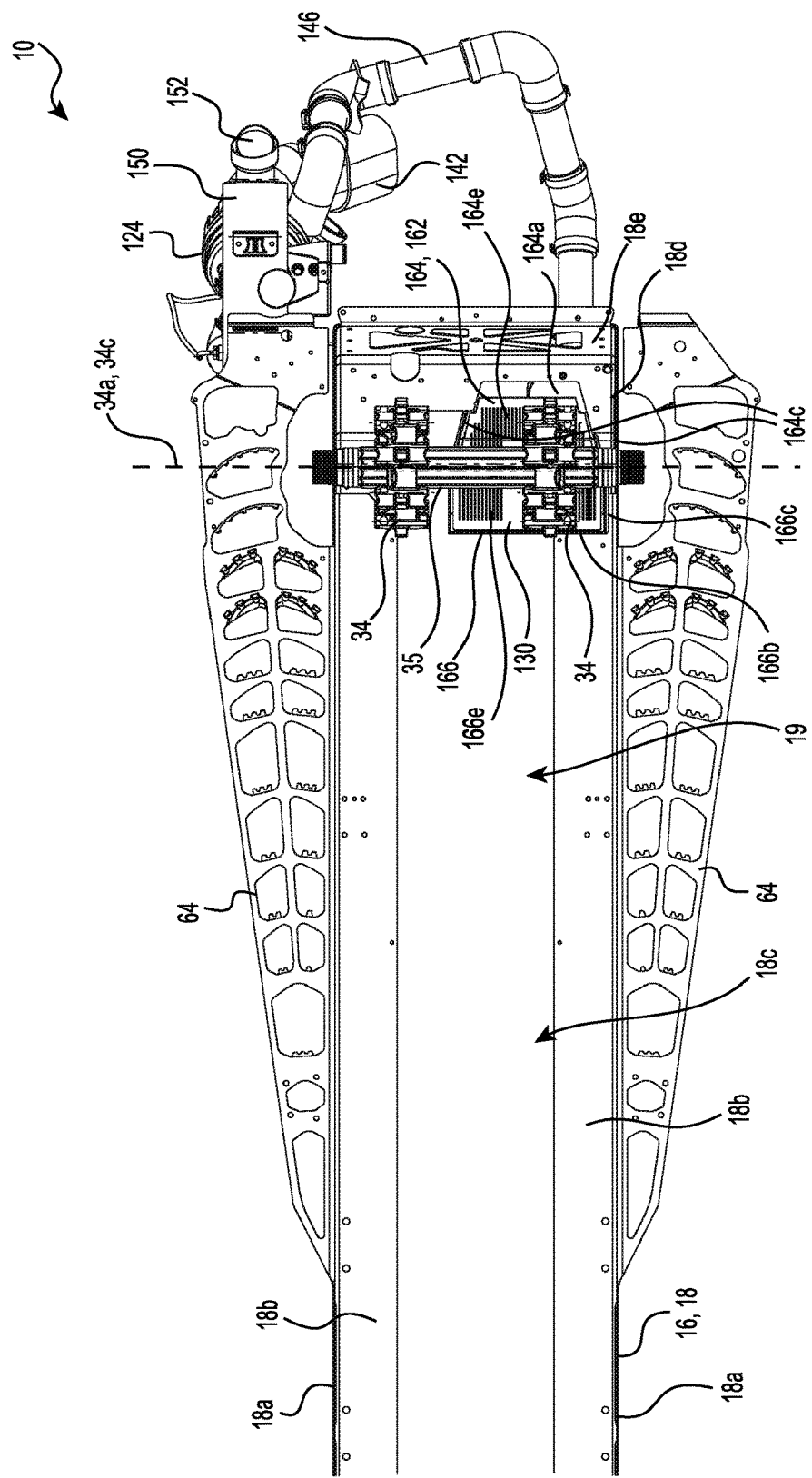
FIG. 8 is a bottom plan view of the air intake system, tunnel, drive axle and drive sprockets of FIG. 6.

As can be seen best in FIGS. 7 and 8, the left drive sprocket 34 and the left side of the drive axle 35 are disposed under the heat exchanger 130. The drive axle 35 is longitudinally aligned with the heat exchanger 130. The forward portion 164 of the heat exchanger 130 extends longitudinally forward of the left drive sprocket 34 while a rear edge of the rearward portion 166 is longitudinally aligned with the rear edge of the left drive sprocket 34 as seen from the dashed lines 34b shown in FIG. 7. Thus, a projection of the heat exchanger 130 onto a horizontal plane intersects with the left drive sprocket 34 and a portion of the drive axle 35. The motion of the drive track 30 around the drive sprockets 34 inside the space 19 projects snow, ice and water onto the bottom wall of the heat exchanger 130. This snow/ice/water being projected onto the bottom surface of the heat exchanger 130 helps to cool the air flowing inside the heat exchanger 130. A number of fins could be provided on the bottom 166e, 164e of the heat exchanger 130 to increase the surface area receiving the snow/ice/water and to thereby enhance cooling efficiency of the heat exchanger 130.

It is contemplated that the forward portion 164 and the rearward portion 166 could be formed separately as a heat exchanger and airbox respectively. The separately formed heat exchanger 164 and airbox 166 could also be disposed separately from one another while being fluidly connected.

With reference to FIGS. 13 to 17, another implementation of an air intake system 100' will now be described. The air intake system 100' is similar to the air intake system 100 described above and will only be discussed below in detail with regard to the differences. Features of the air intake system 100' that are similar to the corresponding features of the air intake system 100 have been labeled with the same reference numbers.

The air intake system 100' includes an air compressor 124, and an intake heat exchanger 240 (FIG. 17), a primary airbox 266, and a throttle body 268. The intake heat exchanger 240 is formed as part of a heat exchanger assembly 200.

The secondary airbox 122 included in the previous implementation has been omitted. Also, in contrast to the air intake system 100, the air intake system 100' includes a primary airbox 266 that is separate from the intake heat exchanger 240, and a single throttle body 268 instead of the left and right throttle bodies 128 of the previous implementation. Ambient air enters the air compressor 124 which compresses the air. Compressed air from the air compressor 124 flows into the intake heat exchanger 240. From the intake heat exchanger 240, air flows through the throttle body 268 into the primary airbox 266 and finally into the engine 26 via the left and right engine air inlets 102.

The air compressor 124 is an exhaust gas driven turbocharger as in the previous implementation. It is however contemplated that the air compressor 124 could be a supercharger. It is also contemplated that the air compressor 124 could be omitted. The turbocharger 124 includes an ambient air inlet 140 which directly receives ambient air. The turbocharger 124 includes a compressed air outlet 144 connected to a conduit 146 which extends rearwards from the turbocharger 124 into the intake heat exchanger 240.

Figure 17:
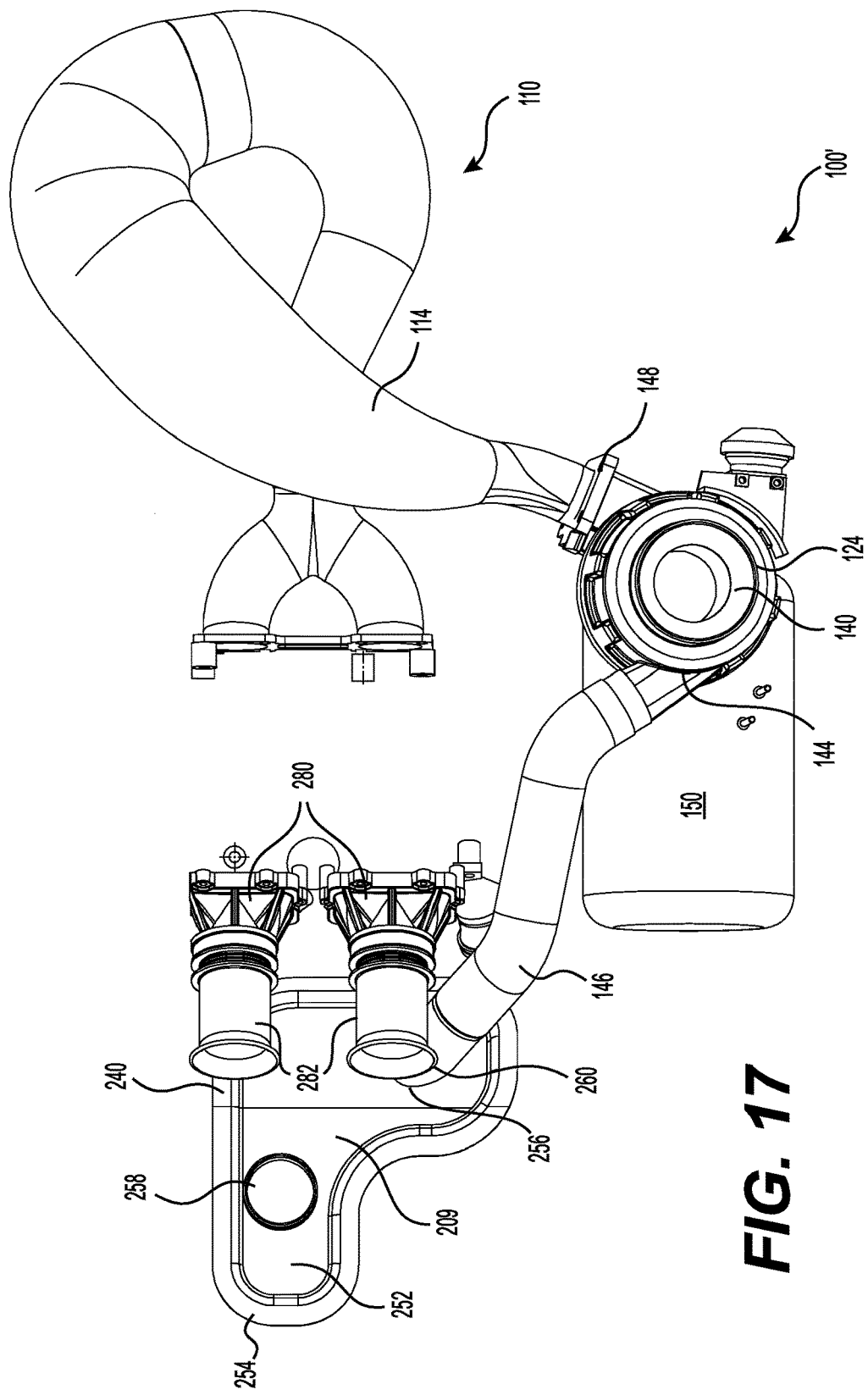
FIG. 17 is a top plan view of a portion of the snowmobile of FIG. 1 showing a portion of the frame, a portion of the air intake system and a bottom part of the air intake heat exchanger.

As can be seen in FIG. 17, the intake heat exchanger 240 has an inlet 256 connected to an inlet pipe 260, and an outlet 258 connected to an outlet pipe 262. The conduit 146 connects to the inlet pipe 260. The throttle body 268 is connected to the outlet pipe 262.

The tubular throttle body 268 extends vertically upwards from the intake heat exchanger 240 to an airbox inlet 270 of the airbox 266. A throttle valve actuator 274 is connected to the throttle valve (not shown) in the throttle body 268.

Figure 15:
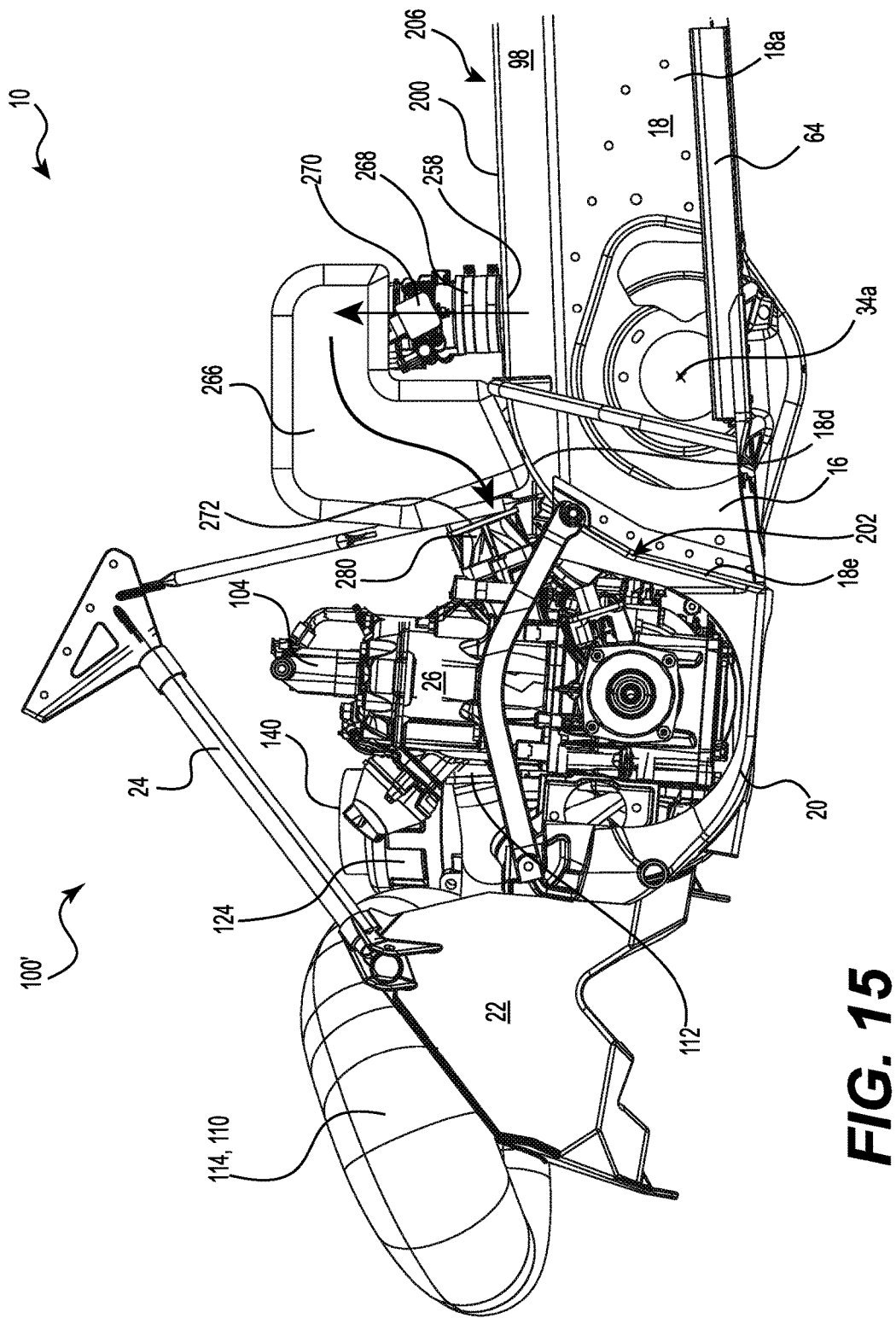
FIG. 15 is a left side elevation view of the snowmobile elements of FIG. 13.
Figure 16:
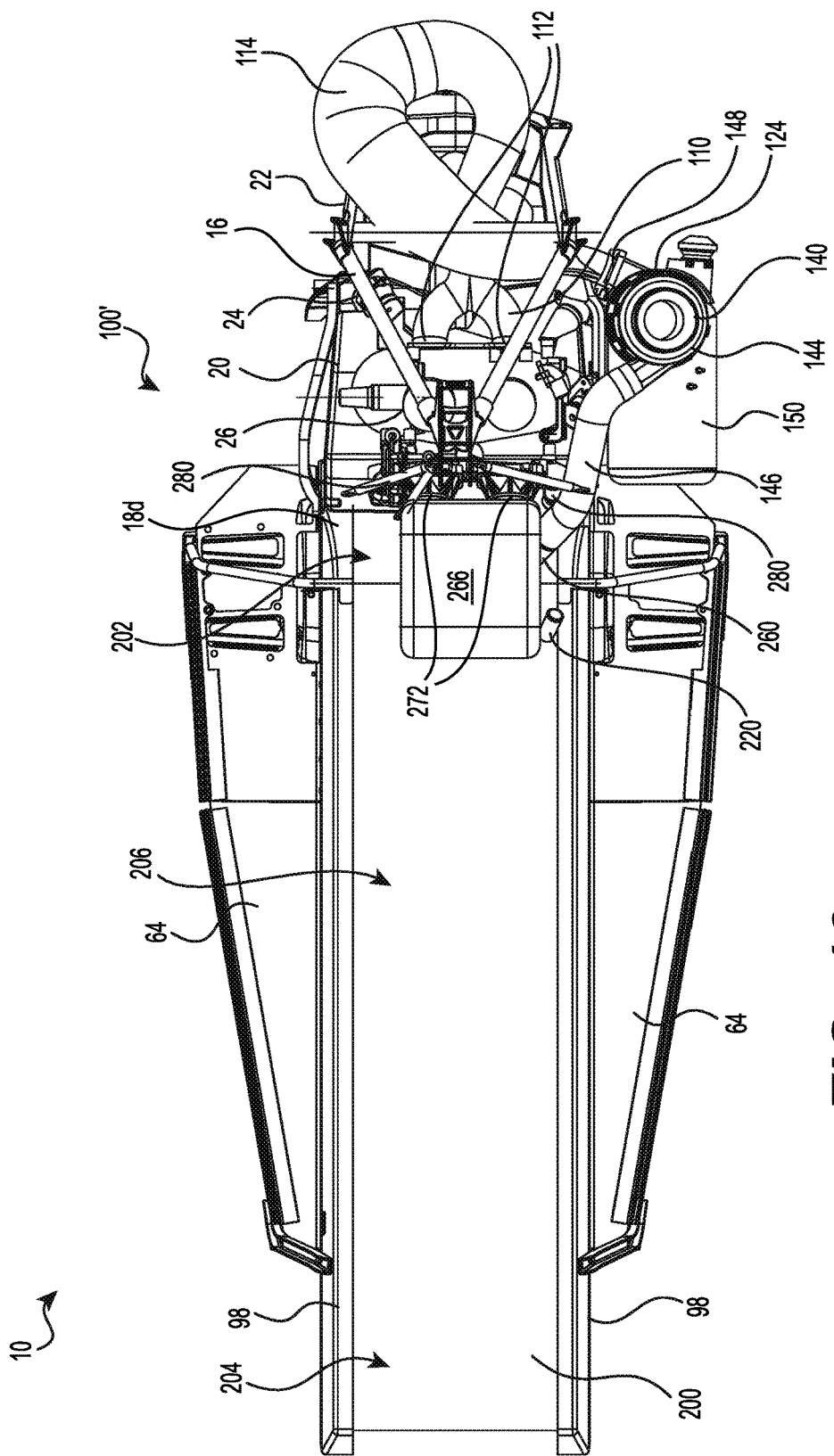
FIG. 16 is a top plan view of the snowmobile elements of FIG. 13.

With reference to FIG. 15, the airbox 266 has an L-shaped body with a vertically extending forward portion and a horizontally extending rearward portion. The forward portion rests on the curved portion of the heat exchanger assembly 200 and extends upwards therefrom. The rearward portion extends rearward from the upper portion of the forward portion. The rearward part is disposed spaced from the heat exchanger assembly 200. The rearward portion is disposed above the outlet 258 of the intake heat exchanger 240.

The airbox inlet 270 is defined in the bottom wall of the rearward portion. Two laterally spaced airbox outlets 272 are defined in the front wall of the airbox 266. The left airbox outlet 272 is connected to the left cylinder via a left intake conduit 280. The right airbox outlet 272 is connected to the right cylinder via a right intake conduit 280. Each intake conduit 280 has a cylindrical flute portion 282 (FIG. 17) which is disposed inside the airbox 266 and aids in noise suppression. The portion of each intake conduit 280 disposed between the airbox 266 and the engine 26 increases in diameter from the airbox 266 towards the engine 26.

Figure 21:
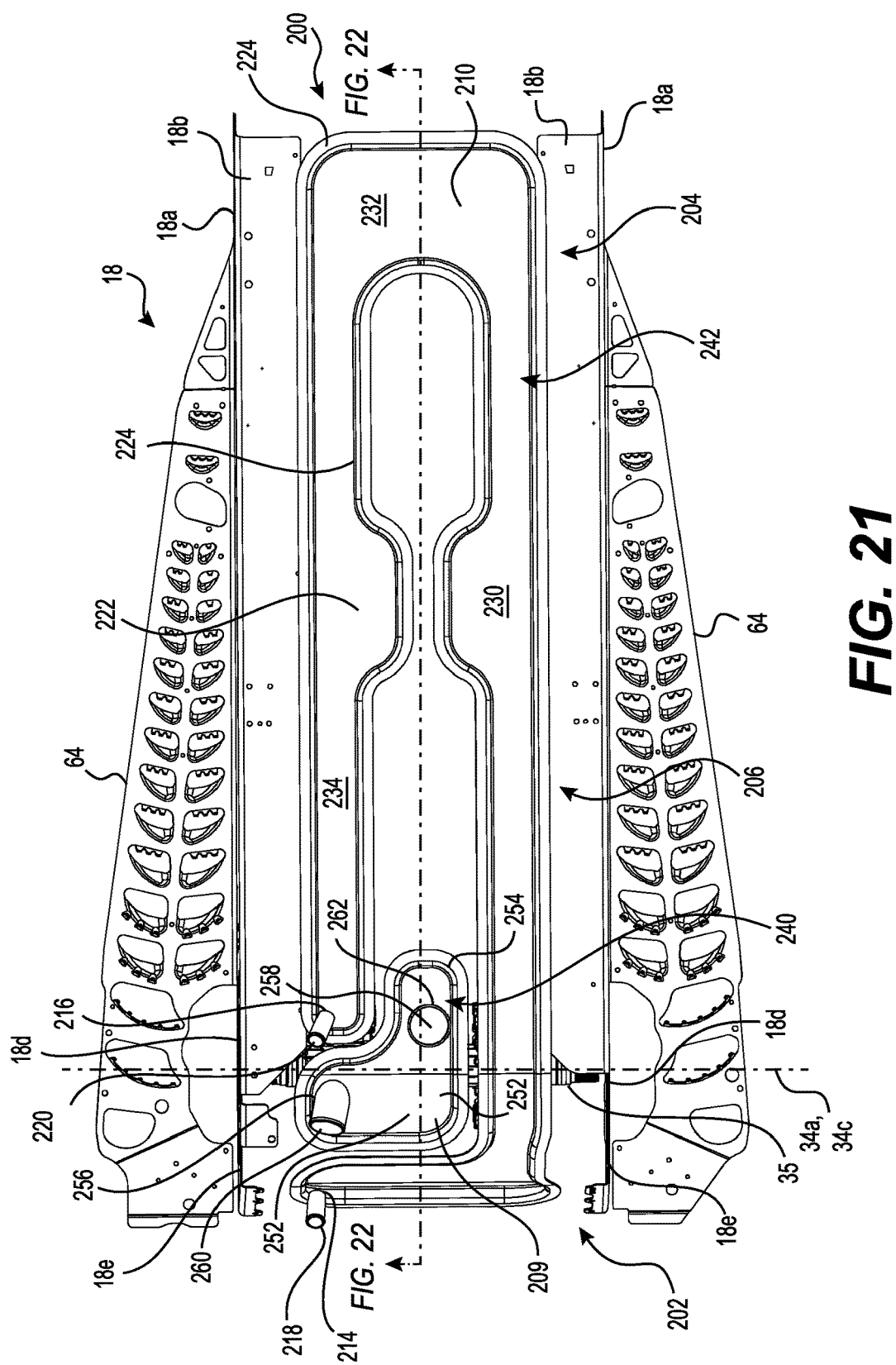
FIG. 21 is top plan view of the tunnel and the heat exchanger assembly of FIG. 18 with the drive axle and drive sprockets being disposed thereunder and a top part of the heat exchanger being removed for clarity.
Figure 22:
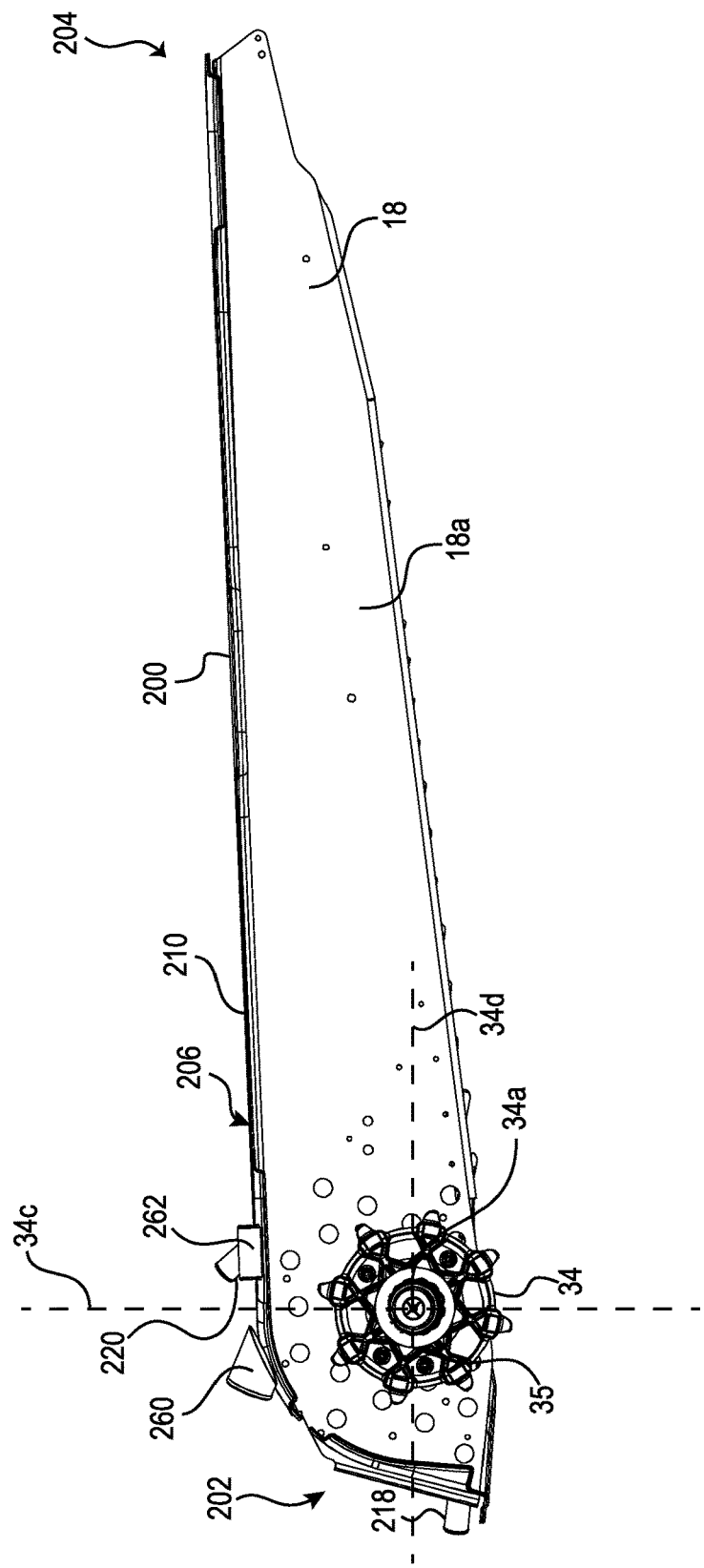
FIG. 22 is a cross-sectional view of the tunnel, the heat exchanger assembly, drive axle and drive sprockets of FIG. 21 taken along the line 22-22 of FIG. 21.
Figure 23:
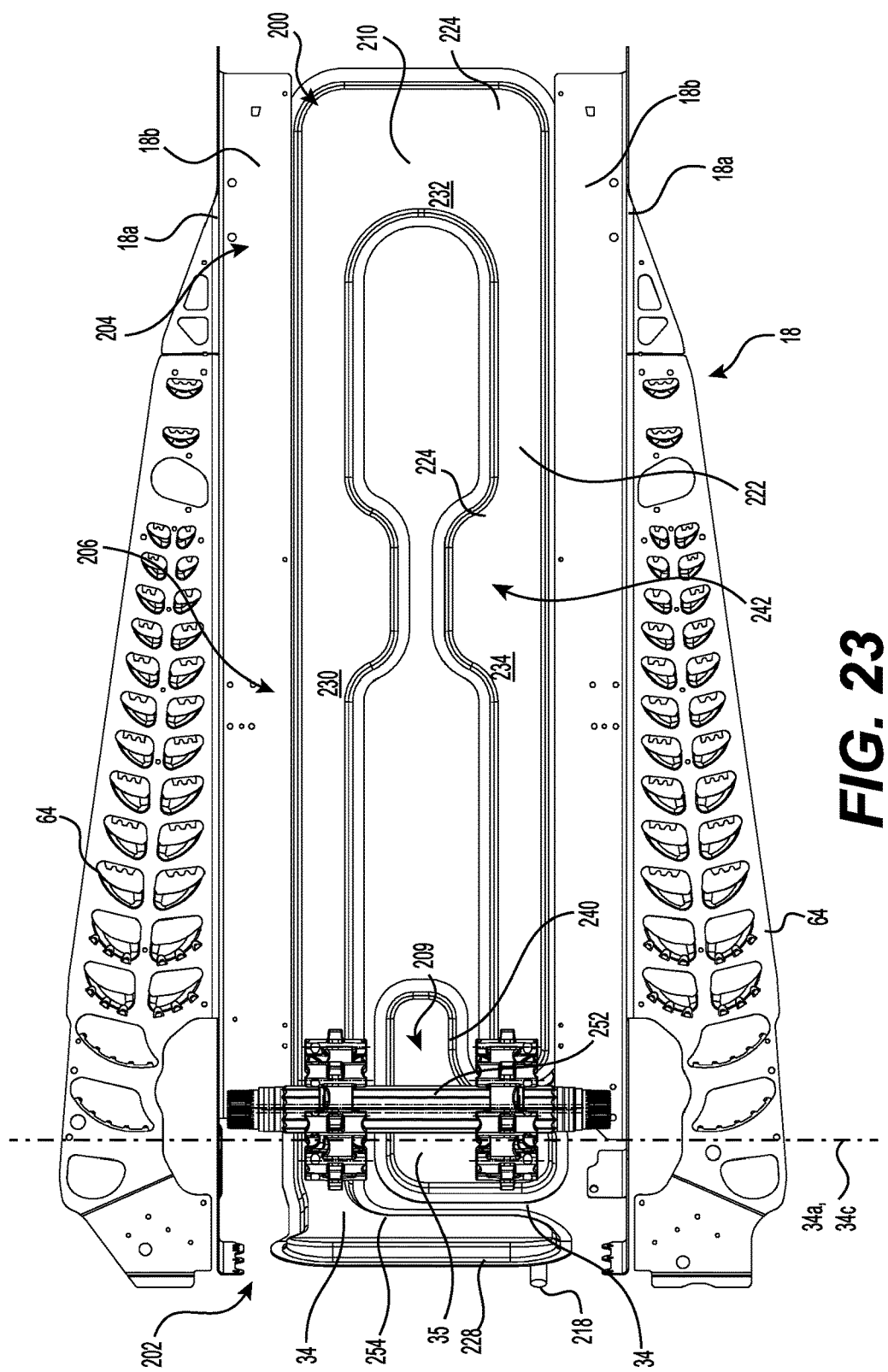
FIG. 23 is bottom plan view of the tunnel, the heat exchanger assembly, drive axle and drive sprockets of FIG. 21.

As can be seen from FIGS. 21 to 23, the intake heat exchanger 240 is disposed above the drive axle 35, and is longitudinally aligned with the sprockets 34. In this position, the bottom part 209 of the intake heat exchanger 240 can be cooled by snow projected by the drive track 30 during operation of the snowmobile 10. The intake heat exchanger inlet 256 is disposed longitudinally forward of the sprocket axis 34a and is longitudinally aligned with a portion of the sprocket 34. The intake heat exchanger outlet 258 is disposed longitudinally rearward of the rotation axis 34a and is longitudinally aligned with a portion of the sprocket 34. The drive axle axis 34a is disposed longitudinally between the intake heat exchanger inlet 256 and the intake heat exchanger outlet 258 such that inlet 256 is on an opposite side of a vertical plane containing the axis 34a than outlet 258. It is contemplated that the inlet 256 and outlet 258 positions could be reversed.

Turning now to FIGS. 18 to 23, the heat exchanger assembly 200 will be described in more detail. The heat exchanger assembly 200 includes a coolant liquid heat exchanger 242 in addition to the intake heat exchanger 240.

In the implementation of the tunnel 18 illustrated in FIGS. 13 to 23, the upper front edge 18d connecting the top 18b to the lower front edge 18e is curved. The upper front edge 18d curves continuously in a downward and a forward direction from the top 18a instead of being angled downwards and forwards therefrom as in the tunnel 18 illustrated in FIGS. 2 to 12.

The heat exchanger assembly 200 extends from the left side portion 18a to the right side portion 18a across the gap 18c. The heat exchanger assembly 200 extends from the left side top 18b to the right side top 18b thereby forming a majority of the top of the tunnel 18. The heat exchanger assembly 200 also extends from the left side front edges 18d, 18e to the right side front edges 18d, 18e, thereby forming a majority of the front of the tunnel 18.

The heat exchanger assembly 200 is fastened, welded or otherwise connected to the side portions 18a. Trims 98 are disposed near the top of each side portion 18a to hide the connection between the heat exchanger assembly 200 and the side portions 18a of the tunnel 18.

The heat exchanger assembly 200 has a front portion 202, a rear portion 204 and a middle portion 206 between the front and rear portions 202, 204. As can be seen, the front portion 202 is curved down from the middle portion 206 such that the front portion 202 extends below the middle portion 206. The front portion 202 also extends below the sprocket axis 34a. The front portion 202 extends over the entire front of the tunnel 18.

Figure 20:
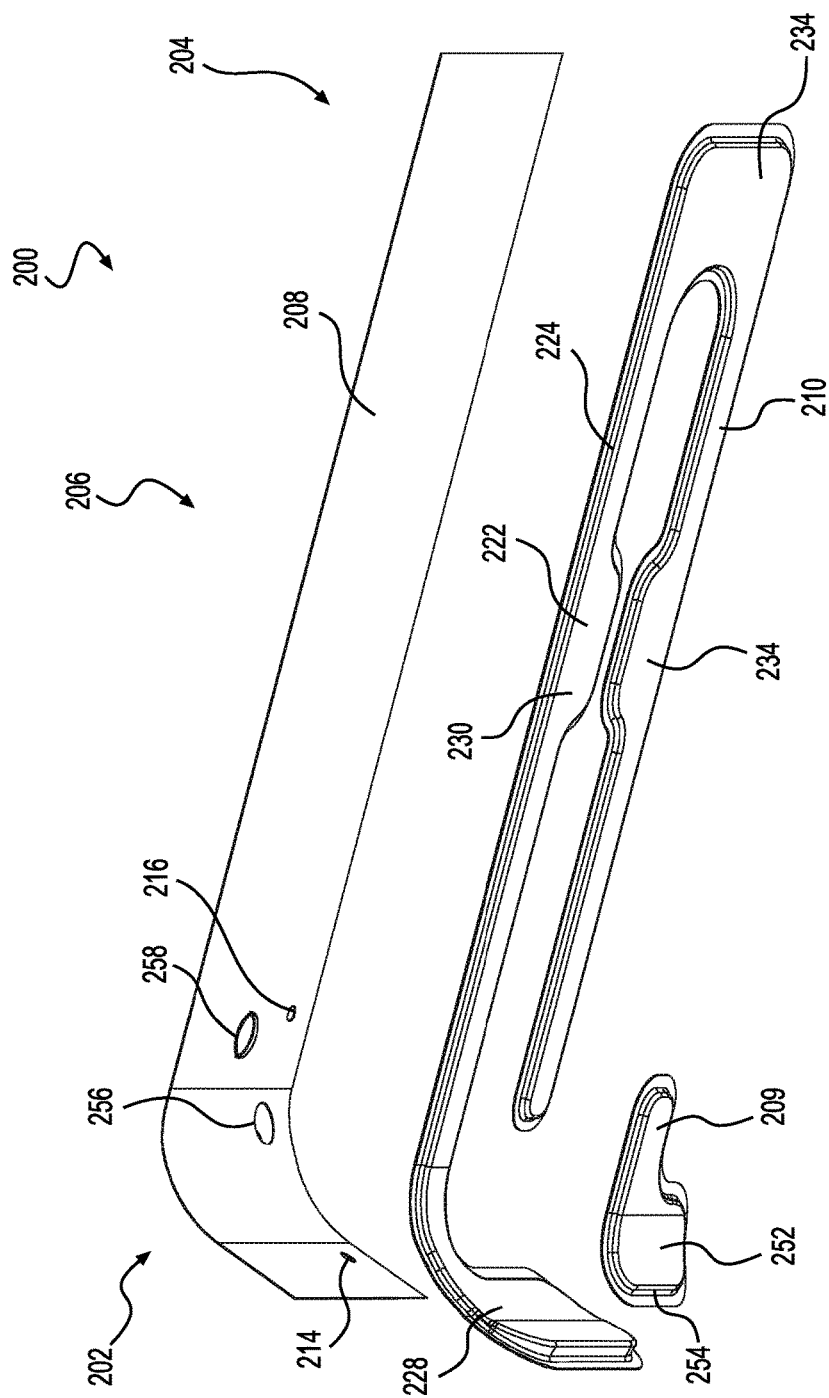
FIG. 20 is an exploded view of the heat exchanger assembly of FIG. 18.

As best seen in FIGS. 20 and 21, the heat exchanger assembly 200 is made of three main parts: a top part 208, a bottom part 209 and another bottom part 210. The bottom part 209 is joined to the top part 208 to form the intake heat exchanger 240. The bottom part 210 is joined to a top part 208 to form the engine coolant heat exchanger 242.

The top part 208 is made of a piece of sheet metal that is curved. The top part 208 is flat in the front portion 202, and then curves rearwards toward the middle portion 206. The top part 208 is flat in the middle and rear portions 206, 204. The top portion 208 also has four apertures 214, 216, 256 and 258, each of which serves as an inlet or outlet to one of the heat exchangers 240, 242 as will be described below.

The bottom part 209 is curved when viewed from a lateral side and has a recess 252 with a border 254 around it. The border 254 is used to weld or otherwise join the bottom part 209 to the bottom of the top part 208 such that the recess 252 forms a passage with the top part 208. The bottom part 209 is joined to the top part 208 in part along the front portion 202 and in part along the middle portion 206. As a result, the recess 252 is also curved to follow the curvature of the top part 208. As can be seen, the recess 252 is generally L-shaped. Since the recess 252 and the top part 208 define the shape of the passage, the passage formed by the recess 252 is generally L-shaped. As seen from a lateral side of the heat exchanger assembly 200, the passage is curved. It is contemplated that the recess 252 could have other shapes.

The bottom part 209 is made of a piece of sheet metal that is curved to match the curvature of the top part 208. Once curved, the bottom part 209 is stamped to form the recess 252. The piece of sheet metal from which the bottom part 209 is made is initially shaped such that only a border 254 is left around the recess 252. Alternatively, it is contemplated that the sheet metal could be cut after the recess 252 has been formed so as to only leave the border 254 around the recess 252.

The aperture 256 of the top part 208 forms an inlet for the passage formed by the recess 252 of the bottom part 209. The aperture 256 connects to an end of the laterally extending arm of the L-shaped passage. The inlet 256 is thus disposed on the front end of the right side of the top of the tunnel 18. The aperture 258 of the top part 208 forms an outlet of the passage formed by the recess 252 of the bottom part 209. The aperture 258 connects to the end of the longitudinally extending arm of the L-shaped passage. The outlet 258 is thus disposed longitudinally rearward of the inlet 256 and laterally centered on the top of the tunnel 18.

An inlet pipe 260 is welded or otherwise joined to the top part 208 around the inlet 256. The inlet pipe 260 is disposed angled forwardly and upwardly from the top part 210. An outlet pipe 262 is welded or otherwise joined to the top part 208 around the outlet 258. The outlet pipe is disposed extending vertically upwards from the top part 210. It is contemplated that the orientation of the pipes 260, 262 could be different than as shown herein.

During operation, ambient air enters via the inlet 140 into the turbocharger 124 where the air is compressed. Compressed air flows out of the turbocharger 124 via the outlet 144 and the conduit 146. The air then flows through the inlet pipe 260 via the inlet 256 into the passage formed by the bottom portion 209. Air flows along the laterally extending arm of the L-shaped passage from the right side of the tunnel 18 to the left side thereof, and then into the longitudinally extending arm of the L-shaped passage. The air then flows rearward in the longitudinally extending L-shaped arm along the top of the tunnel 18 to the outlet 258. From the outlet 258, air flows upward into the throttle body 268 via the outlet pipe 262. The throttle valve actuator 274 regulates the air flowing upwards through the throttle body 168 into the airbox 266. From the airbox 266, some of the air flows out via the left conduit 280 inserted through the left outlet 272 into the left cylinder of the engine 26. The remaining air flows out through the right conduit 280 inserted through the right outlet 272 into the right cylinder of the engine 26.

The bottom part 210 is curved and disposed surrounding the bottom part 209. The bottom part 210 has a recess 222 with a border 224 around it. The border 224 is used to weld or otherwise join the bottom part 210 to the bottom of the top part 208 such that the recess 222 forms a passage with the top part 208. The passage formed by the bottom part 210 is fluidly separate from the passage formed by the bottom part 209.

The shape of the passage is defined by the shape of the recess 222. A passage portion 228 is disposed in the forward portion 202. Passage portions 230, 234 are disposed in the middle and rear portion 206, 204. A passage portion 232 is disposed in the rear portion 204. The passage portion 228 extends laterally in the forward portion and below the bottom part 209. The passage portion 228 is connected to the passage portion 230 extending longitudinally along a left side of the bottom part 209. The passage portion 234 extends longitudinally along a right side of the passage formed by the bottom part 209. The laterally extending passage portion 232 connects the left passage 230 with the right passage 234 rearward of the bottom part 209.

The bottom part 210 is made of a piece of sheet metal that is curved down at its front such that its curvature matches the curvature of the top part 208. Once curved, the bottom part 210 is stamped to form a recess 222. The piece of sheet metal from which the bottom part 210 is made is initially shaped such that only a border 224 is left around the recess 222, thereby reducing the weight of the bottom part 110. Alternatively, it is contemplated that the sheet metal could be cut after the recess 222 has been formed so as to only leave the border 224 around the recess 222. It is also contemplated that the sheet metal could not be cut.

The aperture 216 of the top part 208 forms an inlet, and the aperture 214 forms an outlet of the passage formed by the recess 222 of the bottom part 210. The inlet 216 and outlet 214 connect to opposite ends of the passage formed by the bottom part 210. The inlet 216 is connected to the front end of the right passage portion 234. The inlet 214 is connected to the right end of the front passage portion 228. The outlet 214 is thus disposed longitudinally forward of and vertically lower than the inlet 216. The inlet 216 and the outlet 214 are positioned on opposite sides of a vertical plane 34c containing the axis 34a. The inlet 216 and the outlet 214 are also positioned on opposite sides of a horizontal plane 34d containing axis the 34a. The inlet 216 is disposed longitudinally rearward of the inlet 256 of the passage formed by the bottom portion 209. The outlet 214 is disposed longitudinally forward of and vertically lower than the inlet 256 of the passage formed by the bottom portion 209. It is contemplated that the positions of the inlet 216 and outlet 214 could be interchanged.

Figure 18:
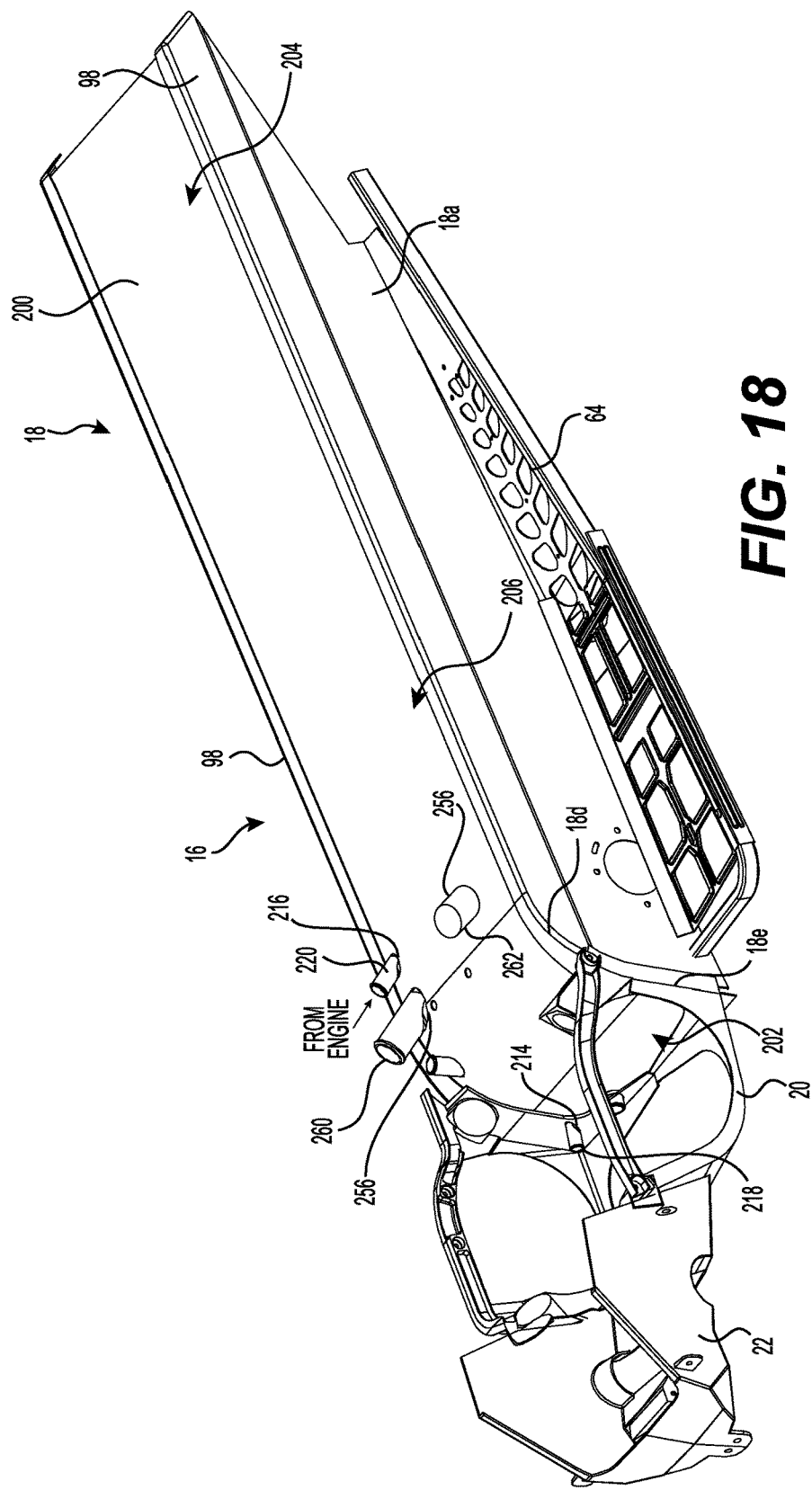
FIG. 18 is a perspective view, taken from a front, left side of the tunnel and the heat exchanger assembly of FIG. 13.
Figure 19:
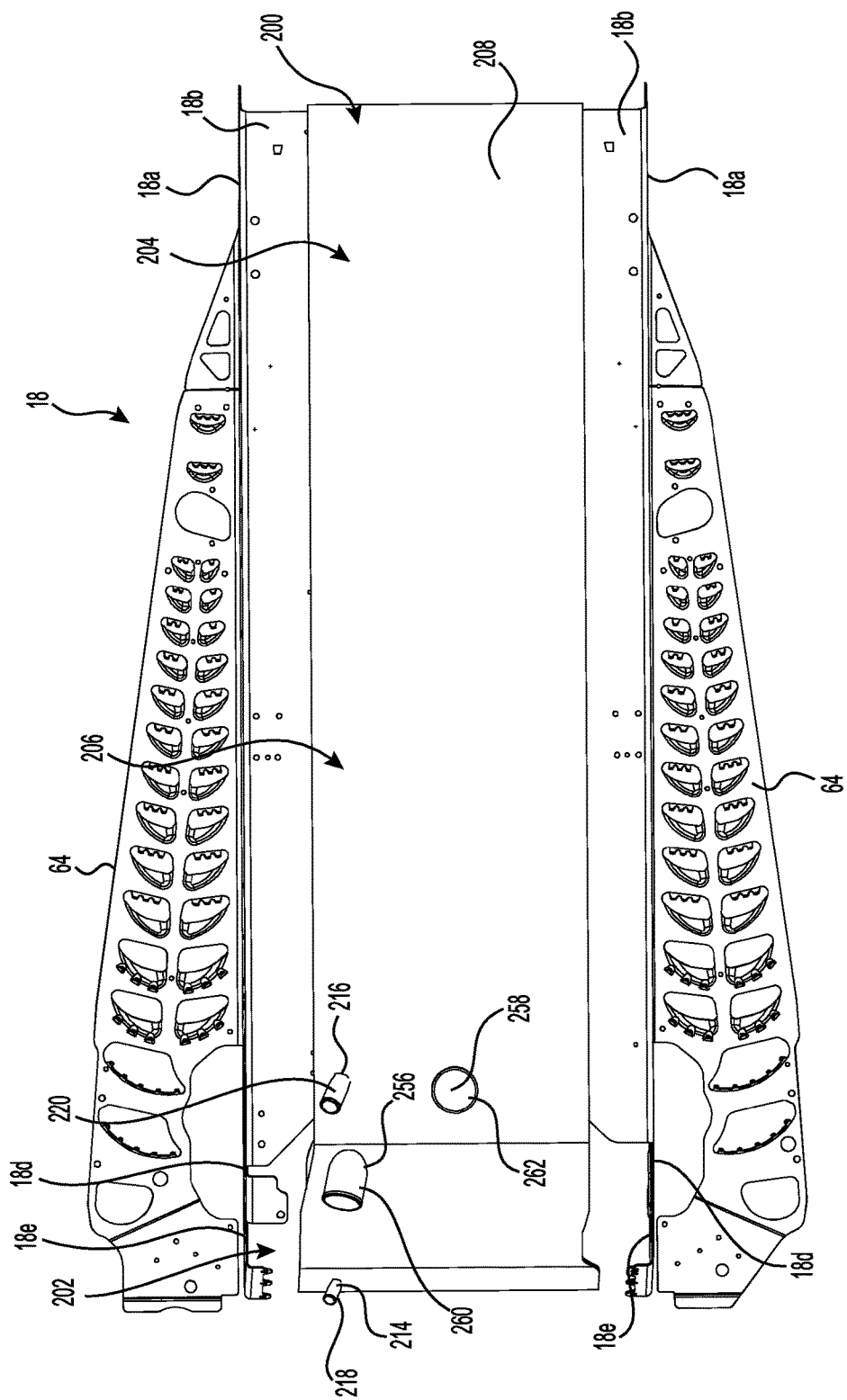
FIG. 19 is top plan view of the tunnel and heat exchanger assembly of FIG. 18.

As can be seen in FIGS. 18 and 19, an inlet pipe 220 is welded or otherwise joined to the top part 208 around the inlet 216 and an outlet pipe 218 is welded or otherwise joined to the top part 208 around the outlet 214. The inlet pipe 220 is disposed angled forwardly and upwardly from the middle portion 206 of the top part 210. The outlet pipe 218 is disposed horizontally and extending forwards from the front portion of the top part 210. It is contemplated that the orientation of the pipes 260, 262 could be different than as shown herein.

As can be seen in FIGS. 21 and 23, the passage portion 228 is located forwardly of the sprocket axis 34a. As the track 30 passes around the sprockets 34, it projects snow onto the portion of the bottom part 210 defining the passage portion 228. Making the passage portion 228 wide and long increases the amount of cooling obtained from this projected snow since a large surface is exposed to the projected snow. The passage portions 230, 232, 234 are cooled by snow projected onto the bottom part 210 by the drive track 30 as well as cool ambient air flowing over the top part 208.

During operation of the engine 26, the hot engine coolant flows from the engine 26 through a pipe (not shown) connected to the inlet pipe 220, then through the inlet pipe 220 and the inlet 216 into the passage formed between the top and bottom parts 208, 210. From the inlet 216, the engine coolant flows through the passage portions 234, 232, 230, and 228. From the portion 228 of the passage, the coolant flows out of the passage via the outlet 214, through the outlet pipe 218 and finally through a pipe (not shown) connected between the outlet pipe 218 and the engine 26 to return the now cooled coolant to the engine 26.

Although in the present implementation, passage formed by the bottom part 210 is used to circulate and thereby cool the engine coolant, it is contemplated that it could be used to cool other motor fluids such as, for example, oil used to lubricate the engine 26.

It is contemplated that the passage portion 228 could be fluidly separate from the passage portions 230, 232, 234 to form a third heat exchanger that is separate from the intake heat exchanger 240 and the coolant heat exchanger 242. It is contemplated that the passage portion 228 could be omitted from the bottom part 210 and be included instead in bottom part 209 so as to be a part of the intake heat exchanger 240 instead of the coolant heat exchanger 242.

It is contemplated that the apertures 214, 216, 256, 258 could be anywhere on the top part 208 as long as the geometry of the passage discussed above is modified accordingly. Other implementations of the heat exchanger assembly 200 are contemplated and described in further detail in U.S. Provisional Patent Application No. 61/872,204 filed on Aug. 30, 2013, the entirety of which is included herein by reference.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A snowmobile comprising:
    a frame including a tunnel, the tunnel having an inverted U-shape and comprising a top portion, a left side portion and a right side portion, the top, left side and right side portions at least partly enclosing a space;
    at least one ski connected to the frame;
    an engine supported by the frame and having an engine air inlet;
    a rear suspension assembly connected to the tunnel; and
    a drive track disposed around the rear suspension assembly and at least in part disposed in the space enclosed by the tunnel, the drive track being operatively connected to the engine; and
    an air intake system for supplying air from the atmosphere to the engine air inlet, the air intake system comprising a heat exchanger surface being at least one of disposed in the space and disposed adjacent to the space, the heat exchanger surface forming a part of the top portion of the tunnel, air flowing through the air intake system to the engine contacting the heat exchanger surface to be cooled thereby before entering the engine.

2. The snowmobile of claim 1, wherein the heat exchanger surface contacts snow projected by the drive track while the snowmobile is being propelled along snow covered ground.

3. The snowmobile of claim 1, wherein the air intake system comprises an air intake heat exchanger comprising the heat exchanger surface.

4. The snowmobile of claim 3, wherein the air intake heat exchanger is disposed in a forward portion of the space.

5. The snowmobile of claim 3, wherein the rear suspension assembly comprises at least one drive sprocket mounted to a drive axle, the air intake heat exchanger being disposed above the drive axle and being longitudinally aligned with the at least one drive sprocket.

6. The snowmobile of claim 1, wherein the air intake system further comprises:
an air compressor fluidly connected to the air intake heat exchanger for feeding compressed air thereto.

7. The snowmobile of claim 6, wherein the air intake system further comprises:
a throttle body fluidly connected to the air intake heat exchanger such that cooled air from the air intake heat exchanger flows to the throttle body, the throttle body having a throttle valve for regulating the amount of air flowing through the throttle body.

8. The snowmobile of claim 7, wherein the air intake system further comprises:
an airbox fluidly connected between the throttle body and the engine.

9. The snowmobile of claim 3, wherein the air intake heat exchanger comprises:
a top part; and
a bottom part joined to the top part to form the air intake heat exchanger, an air passage being formed between the top and bottom parts for permitting flow of air therein.

10. The snowmobile of claim 3, wherein:
the heat exchanger surface is a first heat exchanger surface; and
the snowmobile further comprises:
a coolant heat exchanger fluidly separate from the air intake heat exchanger, the coolant heat exchanger having a second heat exchanger surface forming a part of the top portion of the tunnel, coolant flowing through the coolant heat exchanger to the engine contacting the heat exchanger surface to be cooled thereby before entering the engine.

11. The snowmobile of claim 10, wherein the coolant heat exchanger comprises:
a top part; and
a bottom part joined to the top part to form the coolant heat exchanger, a coolant passage being formed between the top and bottom parts for permitting flow of coolant therein.

12. The snowmobile of claim 3, wherein:
the heat exchanger surface is a first heat exchanger surface;
the snowmobile further comprises:
a coolant heat exchanger fluidly separate from the air intake heat exchanger, the coolant heat exchanger having a second heat exchanger surface forming a part of the top portion of the tunnel, coolant flowing through the coolant heat exchanger to the engine contacting the heat exchanger surface to be cooled thereby before entering the engine;
the air intake heat exchanger comprises:
a top part; and
a first bottom part joined to the top part to form the air intake heat exchanger, an air passage being formed between the top part and the first bottom part for permitting flow of air therein;
and
the coolant heat exchanger comprises:
the top part; and
a second bottom part joined to the top part to form the coolant heat exchanger, a coolant passage being formed between the top part and the second bottom part for permitting flow of coolant therein.

13. The snowmobile of claim 10, wherein:
a first portion of the coolant heat exchanger extends forward of and below the air intake heat exchanger; and
a second portion of the coolant heat exchanger extends rearward of the air intake heat exchanger.

14. The snowmobile of claim 13, wherein:
the rear suspension assembly comprises at least one drive sprocket mounted to a drive axle, the first portion is disposed forward of the drive axle.

15. The snowmobile of claim 13, wherein a third portion of the coolant heat exchanger extends longitudinally along a left side of the air intake heat exchanger.

16. The snowmobile of claim 15, wherein a fourth portion of the coolant heat exchanger extends longitudinally along a right side of the air intake heat exchanger, the third and fourth portions being interconnected by the second portion that extends laterally therebetween.

17. The snowmobile of claim 10, wherein the first and second heat exchanger surfaces contact snow projected by the drive track while the snowmobile is being propelled along snow covered ground.

18. The snowmobile of claim 1, wherein the heat exchanger surface is disposed in a gap defined in the top portion of the tunnel.

* * * * *